(12) United States Patent
Tetu

(10) Patent No.: US 8,825,835 B2
(45) Date of Patent: Sep. 2, 2014

(54) STATUS MONITORING SYSTEM AND METHOD

(75) Inventor: Kevin Tetu, Mesa, AZ (US)

(73) Assignee: FMAUDIT, L.L.C., Jefferson City, MO (US)

( * ) Notice: Subject to any disclaimer, the term of this patent is extended or adjusted under 35 U.S.C. 154(b) by 1762 days.

(21) Appl. No.: 11/995,135

(22) PCT Filed: Dec. 6, 2005

(86) PCT No.: PCT/US2005/044354
§ 371 (c)(1),
(2), (4) Date: Jan. 9, 2008

(87) PCT Pub. No.: WO2007/011419
PCT Pub. Date: Jan. 25, 2007

(65) Prior Publication Data
US 2009/0147299 A1    Jun. 11, 2009

Related U.S. Application Data

(60) Provisional application No. 60/700,453, filed on Jul. 19, 2005.

(51) Int. Cl.
| G06F 15/16 | (2006.01) |
| G06F 15/177 | (2006.01) |
| G06F 15/173 | (2006.01) |
| H04L 12/26 | (2006.01) |
| H04L 12/24 | (2006.01) |

(52) U.S. Cl.
CPC ......... H04L 43/0817 (2013.01); H04L 41/0213 (2013.01)

USPC .......... 709/224; 709/201; 709/217; 709/220; 709/221; 709/222; 709/223

(58) Field of Classification Search
USPC ................... 709/201, 217, 220–224
See application file for complete search history.

(56) References Cited

U.S. PATENT DOCUMENTS

| 5,361,265 | A | 11/1994 | Weinberger et al. | |
| 5,802,420 | A * | 9/1998 | Garr et al. | 399/27 |
| 6,583,886 | B1 | 6/2003 | Ochiai | |
| 6,731,500 | B2 | 5/2004 | Allirot | |
| 6,782,495 | B2 * | 8/2004 | Bernklau-Halvor | 714/44 |
| 6,814,510 | B1 | 11/2004 | Sabbagh et al. | |
| 7,177,957 | B2 * | 2/2007 | Vance | 710/13 |
| 7,312,886 | B2 * | 12/2007 | Gomi | 358/1.15 |
| 7,325,054 | B2 * | 1/2008 | Ishimoto | 709/224 |
| 7,450,259 | B2 * | 11/2008 | Gassho et al. | 358/1.15 |

(Continued)

FOREIGN PATENT DOCUMENTS

| EP | 859309 | 8/1998 | |
| EP | 0878747 B1 * | 8/2003 | G03G 15/08 |
| WO | 0239246 | 5/2002 | |

*Primary Examiner* — Lan-Dai T Truong
*Assistant Examiner* — Angela Widhalm
(74) *Attorney, Agent, or Firm* — Hovey Williams LLP

(57) ABSTRACT

The system comprises a local network including several printing devices provided with a diagnostic unit collecting various device working data's; and at least a connecting device connecting a plurality of printing devices, whereby the connecting device is adapted for collecting data's from a plurality of printing devices and for storing said data's in a digital repository, whereby said digital repository is in a form readable by a processor comprising instructions for treating at least some data's of the digital repository.

40 Claims, 11 Drawing Sheets

(56) References Cited

U.S. PATENT DOCUMENTS

| | | | |
|---|---|---|---|
| 8,023,129 B2 * | 9/2011 | Kawai et al. | 358/1.15 |
| 2003/0115326 A1 * | 6/2003 | Verma et al. | 709/225 |
| 2004/0054583 A1 * | 3/2004 | Nye et al. | 705/14 |
| 2004/0158661 A1 * | 8/2004 | Mokuya | 710/72 |
| 2009/0262381 A1 * | 10/2009 | Tsujimoto | 358/1.14 |

* cited by examiner

STATUS MONITORING SYSTEM AND METHOD

RELATED APPLICATIONS

This is a national phase application of the International Application No. PCT/US2005/044354, which claims priority from U.S. Provisional Application No. 60/700,453 filed Jul. 19, 2005, the disclosures of which are incorporated herein by reference.

BACKGROUND OF THE INVENTION

1. Field of the Invention

The invention relates to a method and a system designed to allow customers of a copier, printer, or office products dealer to click a link and download an application, or load the application from a portable external storage device, that would automatically initiate an asset discovery and generate a baseline of the life meters for copiers, printers and MFP devices.

2. Description of the Prior Art

Prior to this invention, an onsite visit would be necessary to retrieve life meters for copiers, printers and MFP devices.

In order to determine the number of copies printed by a copier or a printer, some printer manufacturers or dealers requested their customers to report telephonically the number of copies indicated on a counter. However, said information needs to be controlled by one or more visits to the customers.

According to another development, the customer has to manually download an application, installs it on his computer, initiates a discovery, and then sends back the results. This method is cumbersome and required a lot of end user interaction, not to mention a base understanding of many processes.

EP 859 309 (European patent designating DE, FR and GB) relates to a system for providing peripheral device status information to workstations on a network. Said patent claims a computer network system comprising:
- a network (wire, fiber or wireless)
- a plurality of workstations
- a first general purpose computer, and
- peripheral devices, such as intelligent printers, fax machines, etc., i.e. device capable of relaying information concerning its current status via a communications line.

The first computer and the peripheral devices are coupled to each other by the network.

The first computer is provided with a software for storing device status information into a device status file, while the first and second peripheral devices include software for determining information concerning the current device status and communicating the same to the first computer via the network periodically or at least when their status is changed to store the same in the device status file. The plurality of workstations include software for requesting the device status information stored in the device status file, receiving the device status information and displaying the device status information (such as of the paper bins, ink supply, etc.).

This system enables to a customer to have an internal control of the current status of his intelligent peripheral devices. However, said information need thereafter to be communicated to the ink provider, paper provider, etc by the local manager.

WO 02/039246 (the corresponding European patent application is deemed withdrawn, while the corresponding US application is still pending. A UK corresponding patent GB2385973 has been granted.) relates to system and method for remote management of local area network printing device. The system disclosed in said document comprises:
- a workstation with one or more computers,
- one or more printing devices connected to at least one computer in the workstation; and
- a remote diagnostic center configured to communicate with one or more printing device and execute a printing device management application to obtain data's from the one or more printing devices.

According to said document, the remote system is located outside the workstation computer, said diagnostic center comprising advantageously a printer information management system communicating with the workstation through the internet. The printer information management system is stored on an Internet website, advantageously accessible by two or more concurrent users. Preferably, the remote diagnostic center is configured to obtain diagnostic data's only after receiving authorization from a workstation computer.

In the embodiment of FIG. 1 of said document, the local area network is connected to the customer ISP server adapted for establishing the internet connection with the remote diagnostic center server.

The system of WO 02/039246 is not adapted for sending alert message to one or more selected managers or persons when new printing papers, ink jet cartridges or other consumables have to be ordered and/or replaced.

The system and method of the present invention is a system or method using a remote management system analyzing at least one data from one or more printing devices so as to establish status report accessible from the remote management system by the customer.

The remote management system of the invention is suitable for determining initial asset discovery by analyzing the existing devices and alternating consumables or hardware replacements, and possibly, but advantageously for performing a second discovery on a future date and comparing the differences in meters, the volumes are extracted for that period of time.

According to an embodiment, the remote management system comprises instructions so as to determine with further information, a cost-per-page and total-cost-of-ownership, possibly along with the return-on-investment (cost savings) if the alternate consumables and/or hardware are rolled out.

The invention relates also to a software and an electronic support with instructions for determining said initial asset discovery, as well as advantageously second asset discovery.

SUMMARY OF THE INVENTION

In the present invention, "printing device" means any electronic device having data communications capabilities and functions to render printed characters on a print support, such a paper sheet, a plastic film, etc. The term printing device includes, but is not limited to, printers, copiers, facsimile machines, plotters, functional peripheral devices, etc.

The term "printer" includes, but is not limited to, laser printers, dot matrix printers, ink jet printers, dry medium printers, toner printers, and the like. The printers are for example printers suitable to print supports or document in black and/or in colors.

The term "communication server" includes any means for establishing a communication links, especially telecommunication links, such as modem, servers, internet servers, etc.

The term "managing people" includes people working for the local network, for example for the maintenance, for placing order for papers, toner cartridges, for maintenance visits, for controlling the use of the printing device(s), for deciding the buy of new machine(s), etc, but also maintenance providers or component providers, such as toner cartridge providers, maintenance providers, paper providers, etc.

The term "data" means information represented in a form suitable for processing by a computer or process and includes, but is not limited to, numerical information, textual information, graphical information, data's, etcetera.

The term "authenticate" means to establish that a person or thing has verifiable or acceptable identity, origin, or authorship; and further means to authentify.

The phrase "process data" means to perform operations on data, including, but not limited to, mathematical operations, logical operations, operations to treat the data, etcetera.

In its most simplified form, the invention relates to a system comprising:
a) a local network comprising several printing devices provided with a diagnostic unit collecting various device working data, and
b) at least a connecting device connecting a plurality of printing devices,
whereby the connecting device is adapted for collecting data from a plurality of printing devices and for storing said data in a digital repository,
whereby said digital repository is in a form readable by a remote processor comprising instructions for processing at least some data of the digital repository.

Advantageously, a removable storage device acts as digital repository, said removable storage device being readable by the remote processor. Such a storage device can be a CD, a disc, a USB accessible memory, a memory accessible via wireless connection, etc.

Preferably, the remote processor includes instructions for reading data from the digital repository, for processing at least part of the data of the digital repository so as to obtain at least one processed data, and for storing at least said processed data on a digital repository.

According to an embodiment, a removable storage device acts as digital repository and includes readable instructions adapted when read by the connecting device to collect data from a plurality of printing devices and for storing said data in the digital repository.

According to a detail of an embodiment, a removable storage device includes readable instructions adapted when read by the connecting device to collect data from a plurality of printing devices and to send said collected data to a remote processor for processing them.

Preferably, the connecting device is an internet server. Advantageously, the system is configured for being initiated from a removable storage device for the purpose of device monitoring (such as status monitoring) and rapid print assessment.

Preferably, the removable storage device is plugged to a component of the local network.

According to a specific system, wherein the removable storage device includes computer readable instructions and data, the system comprises a local processor configured for reading instructions of the removable storage device for initiating the analysis process, whereby the system is further configured:
for collecting information and data from a plurality of printing devices,
for storing collected data in a digital repository of the removable storage device,
for storing collected data in a digital repository connected to a remote network,
for retrieving historical status information from at least one digital repository, and
for reporting at least one monitoring status, The invention relates to a system, comprising:
a) a local network unit comprising at least:
one printing device comprising a diagnostic unit collecting various device working data, said at least one device being intended to be managed by at least one managing people, and
a first communication server, and
b) a remote network unit comprising at least:
a remote processor, and
a second communication server adapted for communicating with the first communication server so as to receive data from the first communication server and so as to send at least one data to the first communication server, wherein the remote processor includes instructions for collecting data from the diagnostic unit, and instructions for processing at least some data from the diagnostic unit so as to emit a signal, and
wherein the emitted signal is in a form accessible to said at least one managing people.

The first and second communication servers are advantageously adapted for communicating through the internet.

According to a specific embodiment, the printing device is directly connected to the first communication server by a connection selected from the group consisting of wires, fibers, wireless connections and mixtures thereof. In this embodiment, the remote processor sends for example a signal directly to the printing device through the server for receiving back data from the printing device, without having to pass through a local processor. After processing in the remote processor, data or signals are sent to the managing person or group of people, for example on a processor, personal computer, cell phone, etc. When a signal is sent on a cell phone, the signal has advantageously the form of a message indicating the managing people to consult an internet site for having access to data and remarks relating to one or more printing devices.

According to a further embodiment, the local network unit comprises at least a local processor between the device and the first communication server, said local processor including instructions for processing at least some data from the diagnostic unit in at least one processed data, and instructions for sending said processed data through the first communication server to the second communication server. In this embodiment, data are directly accessible to authorized people of the local network. When the local processor receives also signals or processed data from the remote network, said signals or data are also advantageously stored, so as to be also accessible to authorized people of the local network.

Advantageously, the diagnostic unit is adapted for collecting at least one working data selected from the group consisting of data relating to a life-time meter read, data relating to a mono meter read, data relating to a color meter read, data relating to a printer pages meter read, data relating to a fax pages meter read, data relating to a copy pages meter read, data relating to a list pages meter read, data relating to a life-time scan meter read, data relating to a fax scan meter read, data relating to a copy scan meter read, data relating to a scan to network processor meter read, data relating to an email scan meter read, data relating to toner coverage read, data relating to low paper indicator, data relating to no paper indicator, data relating to low toner indicator, data relating to no toner indicator, data relating to door open indicator, data relating to a jammed indicator, data relating to an offline indicator, data relating to a service requested indicator, and combinations thereof. Preferably, the diagnostic unit further comprises at least one data relating to the device selected from the group consisting of data relating to device identifier, data relating to the manufacturer of the device, data relating to the model of the device, data relating to the serial number of the device, data relating to a network address of the device, data relating to a description of the device, data relating to the location of the device, and combination thereof.

According to a detail of an embodiment, the remote processor includes identification instructions so as to collect data from diagnostic unit of registered devices.

Preferably, for each device, the remote processor includes instructions for comparing at least two data stored in a remote memory selected from the group consisting of device identifier, data relating to the serial number of the device, data relating to a network address of the device, data relating to a description of the device, data relating to the location of the device, and combination thereof, with data from the diagnostic unit.

According to another embodiment, the remote processor includes instructions for storing in at least one memory, device data selected from the group consisting of collected data, data resulting from a treatment of collected data, emitted signals and combinations thereof.

According to a characteristic or an embodiment, the remote processor includes instructions for storing data in a digital repository, said data being selected from the group consisting of collected data from the diagnostic unit, processed data, emitted signals and combinations thereof.

In an embodiment, the local network comprises a memory for storing data in a digital repository, said data being selected from the group consisting of collected data from the diagnostic unit, processed data, emitted signals and combinations thereof.

According to possible embodiments, the remote processor includes:
  instructions for sending periodically a signal to the device through the second and first communication servers for receiving data from the diagnostic unit of said device, and/or
  instructions for sending periodically a signal to a plurality of device of a same local network through the second and first communication servers for receiving data from the diagnostic unit of said device, and/or
  instructions for sending periodically a signal to a local processor through the second and first communication servers for receiving data from the diagnostic unit of at least one device in communication with said local processor, and/or
  instructions for sending periodically a signal to a group of local processors through the second and first communication servers for receiving data from the diagnostic unit of a plurality of devices in communication with at least one local processor of said group of local processors, and/or
  instructions for authorizing access to the storage memory by a managing people through a communicating channel, and/or
  instructions for identifying or authenticating the managing people and for authorizing access to the data of the storage memory relating to devices in management by said managing people.

Advantageously, the first communication server and the second communication servers are adapted for communicating through internet with interposition with at least a firewall. For example, at least one server selected from the group consisting of the first communicating server and the second communicating server includes firewall instructions. Specific examples are:
  the remote processor includes firewall instructions, and/or
  the local processor includes firewall instructions and/or
  the first communication server includes instructions for sending data of the diagnostic unit of the printing device to the remote network, as well as to a memory of the local network.

According to an advantageous embodiment, the remote processor includes instructions for sending at least one signal to a communication device accessible to at least one managing people of the printing device, said communication device being selected from the group consisting of personal computer with communicating means, cell phone, computer associated to a communication server, computer associated to a local network, and combinations thereof.

Possibly, the local network comprises at least one local processor and a plurality of printing devices, whereby at least one printing device is in communication with the local processor through an internet communication server and an internet network.

For example, the local network includes a firewall for protecting at least the local network from the internet network.

According to a preferred embodiment, the remote network is adapted for receiving data relating to a status of at least one printing device of the local network, as well as data relating to configuration information corresponding to said at least one printing device.

In a particular case, at least one digital repository is used for the storage of data, said digital repository comprising at least a database. For example, the remote processor is configured for storing data in a digital repository through an open database connectivity interface.

The remote processor includes for example readable instructions comprising at least one characteristic selected from the group consisting of a dynamic link library, a static link library, a script, a JAVA class, a .NET class, a C++ class, a .NET library routine, and combinations thereof.

According to another embodiment, the system is configured for storing data in a first digital repository through an open database connectivity interface, and in a second digital repository of the local network unit.

According to an example, the local network comprises at least one local processor, and wherein the remote processor includes instructions for sending a software or program through the second communication server and the first communication server to at least one local processor, whereby said local processor includes instructions for storing said software or program in a local memory.

According to another example, the remote processor includes instructions for carrying at least one determination selected from the group consisting of data relating to alternating consumables, data relating to replacements, future data, cost related data and combinations thereof.

The invention relates also to:
  a method for remotely processing in a remote network unit data relating to at least one printing device of a local network comprising at least a first communication server, said treatment being carried out in a remote network unit comprising at least a remote processor and a second communication server, in which data relating to at least one printing device of the local network are transferred through the first and second communication servers to the remote processor, and in which the remote processor processes the received data and stores said data in a digital repository memory, which is in a form available by at least one authorized people managing the printing device of the local network, and to a method for remotely processing in a remote network unit data relating to at least one printing device of a local network comprising at least a first communication server, said processing being carried out in a remote network unit comprising at least a remote processor and a second communication server, in which data relating to at least one printing device of the local network are transferred through the first and second communication servers to the remote processor, in which the remote processor processes the received data and instructs the emission of at least one signal in a form accessible to at least one authorized people managing the printing device of the local network.

Advantageously, a signal is emitted to one authorized people managing the printing device of the local network, when the remote processor instructs said emission.

Preferably, a signal is emitted to one authorized people managing the printing device of the local network, when the remote processor instructs said emission in function of at least one processed data.

Most preferably, the first and second communication servers communicates there between by using an internet protocol.

According to an embodiment, the data of the printing device are sent to a local processor, in which at least some data of the printing device are processed by instructions of the local processor so as to determine at least one local processor processed data, which is sent to the remote processor via the first and second communication servers.

The sending of the local processor processed data is advantageously controlled by a processor selected from the group consisting of the local processor and the remote processor.

For example, the data relating to at least one printing device is selected from the group consisting of data relating to a life-time meter read, data relating to a mono meter read, data relating to a color meter read, data relating to a printer pages meter read, data relating to a fax pages meter read, data relating to a copy pages meter read, data relating to a list pages meter read, data relating to a life-time scan meter read, data relating to a fax scan meter read, data relating to a copy scan meter read, data relating to a scan to network processor meter read, data relating to an email scan meter read, data relating to toner coverage read, data relating to low paper indicator, data relating to no paper indicator, data relating to low toner indicator, data relating to no toner indicator, data relating to door open indicator, data relating to a jammed indicator, data relating to an offline indicator, data relating to a service requested indicator, and combinations thereof.

According to a detail, at least one data relating to the device selected from the group consisting of data relating to device identifier, data relating to the manufacturer of the device, data relating to the model of the device, data relating to the serial number of the device, data relating to a network address of the device, data relating to a description of the device, data relating to the location of the device, and combination thereof is sent to the remote processor for identifying or authenticating the printing device from which data are received by the remote processor.

The printing device is first identified or authenticated by the remote processor, before processing data relating to said printing device by the remote processor.

Preferably, the remote processor identifies the printing device by comparing at least two data stored in a remote memory selected from the group consisting of device identifier, data relating to the serial number of the device, data relating to a network address of the device, data relating to a description of the device, data relating to the location of the device, and combination thereof, with received data relating to the printing device.

Most preferably, the remote processor selects at least two stored data to be compared with data from the printing device, and actuates a communication with the printing device for receiving a signal from said printing device relating to the data to be compared with.

According to possible embodiments of the method, the remote processor stores:

in at least one memory, printing device data selected from the group consisting of collected data, data resulting from processing of collected data, emitted signals and combinations thereof, and/or data in a digital repository, said data being selected from the group consisting of collected data from the diagnostic unit, processed data, emitted signals and combinations thereof.

According to another detail, data selected from the group consisting of collected data from the diagnostic unit, processed data, emitted signals, signals from the remote processor and combinations thereof are stored in a digital repository of the local network.

According to characteristic of a method, a signal is sent periodically by the remote processor to the printing device through the second and first communication servers for receiving diagnostic data from said printing device, and/or by the remote processor to a plurality of printing devices of a same local network through the second and first communication servers for receiving diagnostic data from said printing devices, and/or by the remote processor to a local processor through the second and first communication servers for receiving diagnostic data of at least one printing device in communication with said local processor, and/or by the remote processor to a group of local processors through the second and first communication servers for receiving diagnostic data from a plurality of printing devices in communication with at least one local processor of said group of local processors.

According to a further detail of an embodiment, the access to the storage memory by a managing people through a communicating channel is controlled by the remote processor by an authorization—identification protocol.

Advantageously, the access to the storage memory by a managing people through a communicating channel is controlled by the remote processor by an authorization—identification protocol for authorizing access to the data of the storage memory relating to devices in management by said managing people.

According to further characteristic of embodiments of the method of the invention:

at least the received data through a communication server are processed by at least a firewall, and/or diagnostic data of the printing device are sent to the remote network, as well as to a memory of the local network, and/or at least one signal is sent to a communication device accessible to at least one managing people of the printing device, said communication device being selected from the group consisting of personal computer with communicating means, cell phone, computer associated to a communication server, computer associated to a local network, and combinations thereof, and/or the local network comprises at least one local processor and a plurality of printing devices, whereby data of at least one printing device is sent via internet, and/or the data are stored at least in a digital repository through an open database connectivity interface, and/or readable instructions comprising at least one characteristic selected from the group consisting of a dynamic link library, a static link library, a script, a JAVA class, a .NET class, a C++ class, a .NET library routine and combinations thereof are used in the remote processor, and/or data are stored in a first digital repository through an open database connectivity interface, and in a second digital repository of the local network, and/or a software or program is sent from the remote processor to a local processor through the second communication server and the first communication server, and/or instructions for carrying at least one determination selected from the group consisting of data relating to alternating consumables, data relating to replacements, future data, cost related data and combinations thereof are determined by the remote processor.

The invention further relates to a computer implemented connecting device adapted for ensuring a connection between a local processor connected to a network (such as a local area network, a wide area network and a combination thereof) and at least one local printing device, preferably several printing devices for example from 2 to 10, said connecting device comprising processor readable instructions for the local processor, said instructions comprising:

instructions to be installed on the local processor for communicating with at least one local printing device for collecting data from said at least one printing device, instructions for storing at least part of said collected data in a digital repository.

Advantageously, the instructions for communicating with at least one local printing device are adapted for ensuring communication using a network management protocol.

Preferably, the instructions for storing at least part of said collected data in a digital repository are adapted for storing at least part of said data in a digital repository selected among the group consisting of digital repository on the local network, digital repository on a remote network, digital repository on an external storage device, and combinations thereof.

According to n embodiment, the instructions to be installed on the local processor for communicating with at least one local printing device for collecting data from said at least one printing device are instructions adapted for collecting at least one data relating to a status of the printing device and/or for collecting at least one data relating to the configuration of the printing device.

For example, the connecting device is adapted for connecting a processor with a printing device selected from the group consisting of printers, fax machines, copiers and multi-function devices, preferably via the ports thereof.

The connecting device comprises advantageously readable instructions for collecting at least one data, preferably at least two data (more preferably more than three) selected from the group consisting of printing device identifier, printing device manufacturer, printing device model, printing device serial number, network address of the local processor, printing device description, printing device location, life-time meter read of the printing device, mono meter read of the printing device, color meter read of the printing device, printer pages meter read, fax pages meter read, copy pages meter read, list pages meter read, life-time scan meter read, fax scan meter read, copy scan meter read, scan to network processor meter read, email scan meter read, toner coverage read, low paper indicator, no paper indicator, low toner indicator, no toner indicator, door open indicator, jammed indicator, offline indicator, service requested indicator, printed document identifiers (i.e. who printed), the type of paper (drawer, source, color, size, etc), the number of page, the date and time of printing, the document name, the user department code, the user department code, the number of copies and/or prints per department, and combinations thereof.

According to a detail of an embodiment, the connecting device comprises readable instructions for communicating with at least one local printing device for collecting data from said at least one printing device through a wide area network. Preferably, at least a portion of the wide area network comprises the Internet.

According to another advantageous detail, the connecting device comprises readable instructions for communicating with at least on printing device, a local processor and a digital repository through at least one protocol selected from the group consisting of simple network management (SNMP) protocols, Printer Job Language (PJL) protocols, Printer Management Language (PML) protocols, extensible markup language (XML) protocols, Internet Control Message Protocols (ICMP), Visual basic (VB) and combinations thereof.

The connecting device comprises advantageously port connecting means adapted for connecting the device via a connecting cable to a port of the local processor and a printing device. Preferably, the connecting device comprises instructions of port language selected from the group consisting of PJL port language, PML port language and combinations thereof.

For example, the connecting device comprises instructions in various port languages and instructions to select a port management language to be used for communication between the connecting device and the printing device based on a data selected from the group consisting of printing device manufacturer, models of printing device and combinations thereof.

According to further characteristics, the connecting device further comprises:

processor readable instructions adapted for assigning a unique Object Identifier (OID) node of a Management Information Base (MIB) tree to each printing device attached via processors local ports, and/or processor readable instructions adapted when a printing device is reconfigured, to re-assign a unique Object Identifier (OID) node of a Management Information Base (MIB) tree to each printing device attached via the processor local ports, and/or processor readable instructions adapted when a printing device is added, to re-assign a unique Object Identifier (OID) node of a Management Information Base (MIB) tree to each printing device attached via the processor local ports, and/or processor readable instructions adapted when a printing device is removed, to re-assign a unique Object Identifier (OID) node of a Management Information Base (MIB) tree to each printing device attached via the processor local ports, and/or instructions for requiring from an authorized people the number of printing devices and the print driver names of the printing devices, and/or instructions for requiring from an authorized people for each locally attached printing device or group of printing devices, the number of printing devices and the print driver names of the printing devices, the extent of the communication between the authorized people and the printing device advantageously depending on the port management language used, and/or instructions for extracting at least one data selected from the group consisting of IP address of the local processor, printing driver; manufacturer and model name, manufacturer, model, location, description from a local processor operating system, and/or instructions for extracting at least one life-time meter read from the printing device using a PJL language via a processors local port, and/or instructions for extracting at least one data selected from the group consisting of IP address of the local processor, printer driver; manufacturer and model name from the local processor operating system and for extracting at least one data of the printing device selected from the group consisting of manufacturer, model, serial number, description, location, life-time meter read, mono meter read, color meter read, printer pages meter read, fax pages meter read, copy pages meter read, list pages meter read, life-time scan meter read, fax scan meter read, copy scan meter read, scan to network processor meter read, email scan meter read, toner coverage read, low paper indicator, no paper indicator, low toner indicator, no toner indicator, door open indicator, jammed indicator, offline indicator, service requested indicator; using a PML language via a processors local port, and/or instructions for connecting printing devices via an intranet remote network, and/or instructions for storing data in a digital repository comprising at least a database, and/or processor readable instructions comprising at least one characteristic selected from the group consisting of dynamic link library, static link library, script, JAVA class, .NET class, C++ class, .NET library routine, and combinations thereof, and/or instructions for storing data in a digital repository through an open database connectivity interface.

The invention relates also to the use of a connecting device of the invention for monitoring at least one, preferably several locally attached printing devices via one or more local processors, preferably via processor local port(s).

A method of the invention is a method for monitoring and rapid print assessment of locally attached printing devices via at least one processor local port, in which a computer implemented connecting device ensures a connection between a local processor connected to a network and at least one local printing device, whereby said connecting device comprises processor readable instructions for the local processor, said instructions comprising:

instructions to be installed on the local processor for communicating with at least one local printing device for collecting data from said at least one printing device, instructions for storing at least part of said collected data in a digital repository.

The connecting device communicates advantageously with at least one local printing device by using a network management protocol.

Preferably, instructions are installed on the local processor for storing at least part of said collected data in a digital repository are adapted for storing at least part of said data in a digital repository selected among the group consisting of digital repository on the local network, digital repository on a remote network, digital repository on an external storage device, and combinations thereof.

According to an embodiment, instructions are installed on the local processor, whereby said local processor communicates with at least one local printing device for collecting data from said at least one printing device are instructions adapted for collecting at least one data relating to a status of the printing device and/or instructions are installed on the local processor, whereby the local processor communicates with at least one local printing device for collecting data from said at least one printing device are instructions adapted for collecting at least one data relating to the configuration of the printing device.

For example, the printing device is selected from the group consisting of printers, fax machines, copiers and multi-function devices.

According to details of the method of the invention:

the connecting device comprises readable instructions for collecting at least one data selected from the group consisting of printing device identifier, printing device manufacturer, printing device model, printing device serial number, network address of the local processor, printing device description, printing device location, life-time meter read of the printing device, mono meter read of the printing device, color meter read of the printing device, printer pages meter read, fax pages meter read, copy pages meter read, list pages meter read, life-time scan meter read, fax scan meter read, copy scan meter read, scan to network processor meter read, email scan meter read, toner coverage read, low paper indicator, no paper indicator, low toner indicator, no toner indicator, door open indicator, jammed indicator, offline indicator, service requested indicator, printed document identifiers (i.e. who printed), the type of paper (drawer, source, color, size, etc), the number of page, the date and time of printing, the document name, the user department code, the user department code, the number of copies and/or prints per department, and combinations thereof, whereby after said instructions being installed on the local processor, the local processor collects said at least one data at least at a determined time, and/or the connecting device comprises readable instructions for communicating with at least one local printing device for collecting data from said at least one printing device through a wide area network, whereby after said instructions being installed on the local processor, the local processor collects data at least at a determined time, at least a portion of the wide area network comprising advantageously the Internet.

According to further details of methods of the invention, the method comprises one or more of the following details:

the connecting device comprises readable instructions for communicating with at least on printing device, a local processor and a digital repository through at least one protocol selected from the group consisting of simple network management (SNMP) protocols, Printer Job Language (PJL) protocols, Printer Management Language (PML) protocols, extensible markup language (XML) protocols, Internet Control Message Protocols (ICMP), Visual basic (VB) and combinations thereof, whereby after said instructions being installed on the local processor, the local processor communicates by at least one said protocol with the printing device at least at a determined time, such as when required by an authorized people, at a specific moment of the day, substantially in continuous manner, etc.

the connecting device is connected by at least one connecting cable to a port of the local processor and to a port of at least one printing device.

the connecting device comprises instructions of port language selected from the group consisting of PJL port language, PML port language and combinations thereof.

the connecting device comprises instructions in various port languages and instructions to select a port management language to be used for communication between the connecting device and the printing device based on a data selected from the group consisting of printing device manufacturer, models of printing device and combinations thereof, and in which the port management language to be used is selected by encoding on the local processor at least one of said data selected from the group consisting of printing device manufacturer, models of printing device and combinations thereof.

the connecting device further comprises processor readable instructions adapted for assigning a unique Object Identifier (OID) node of a Management Information Base (MIB) tree to each printing device attached via processors local ports, whereby after said instructions being installed on the local processor, the local processor assigns a unique Object Identifier (OID) node of a Management Information Base (MIB) tree to each printing device attached via processors local ports.

the connecting device further comprises processor readable instructions adapted when a printing device is reconfigured, to re-assign a unique Object Identifier (OID) node of a Management Information Base (MIB) tree to each printing device attached via the processor local ports, whereby after said instructions being installed on the local processor, the local processor re-assigns a unique Object Identifier (OID) node of a Management Information Base (MIB) tree to each printing device attached via processors local ports when a printing device is reconfigured.

the connecting device further comprises processor readable instructions adapted when a printing device is added, to re-assign a unique Object Identifier (OID) node of a Management Information Base (MIB) tree to each printing device attached via the processor local ports, whereby after said instructions being installed on the local processor, the local processor re-assigns a unique Object Identifier (OID) node of a Management Information Base (MIB) tree to each printing device attached via processors local ports when a printing device is added.

the connecting device further comprises processor readable instructions adapted when a printing device is removed, to re-assign a unique Object Identifier (OID) node of a Management Information Base (MIB) tree to each printing device attached via the processor local ports, whereby after said instructions being installed on the local processor, the local processor re-assigns a unique Object Identifier (OID) node of a Management Information Base (MIB) tree to each printing device attached via processors local ports when a printing device is removed.

the connecting device comprises instructions for requiring from an authorized people the number of printing devices and the print driver names of the printing devices, whereby after said instructions being installed on the local processor, the local processor request from an authorized people the number of printing devices and the print driver names of the printing devices.

the connecting device comprises instructions for requiring from an authorized people for each locally attached printing device or group of printing devices, the number of printing devices and the print driver names of the printing devices, whereby after said instructions being installed on the local processor, the local processor request from an authorized people the number of printing devices and the print driver names of the printing devices.

the extent of the communication between the authorized people and the printing device depends on the port management language used.

the connecting device extracts at least one data selected from the group consisting of IP address of the local processor, printing driver; manufacturer and model name, manufacturer, model, location, description from a local processor operating system.

the connecting device extracts at least one life-time meter read from the printing device using a PJL language via a processors local port.

the connecting device controls the extraction of at least one data selected from the group consisting of IP address of the local processor, printer driver; manufacturer and model name from the local processor operating system and for extracting at least one data of the printing device selected from the group consisting of manufacturer, model, serial number, description, location, life-time meter read, mono meter read, color meter read, printer pages meter read, fax pages meter read, copy pages meter read, list pages meter read, life-time scan meter read, fax scan meter read, copy scan meter read, scan to network processor meter read, email scan meter read, toner coverage read, low paper indicator, no paper indicator, low toner indicator, no toner indicator, door open indicator, jammed indicator, offline indicator, service requested indicator; using a PML language via a processors local port.

the connecting device comprises instructions for connecting printing devices via an intranet remote network.

the connecting device comprises instructions for storing data in a digital repository comprising at least a database.

the connecting device comprises processor readable instructions comprising at least one characteristic selected from the group consisting of dynamic link library, static link library, script, JAVA class, .NET class, C++ class, .NET library routine, and combinations thereof.

the connecting device comprises instructions for storing data in a digital repository through an open database connectivity Details and characteristics of a preferred embodiment of the invention will appear from the following description in which reference is made to the attached drawings.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
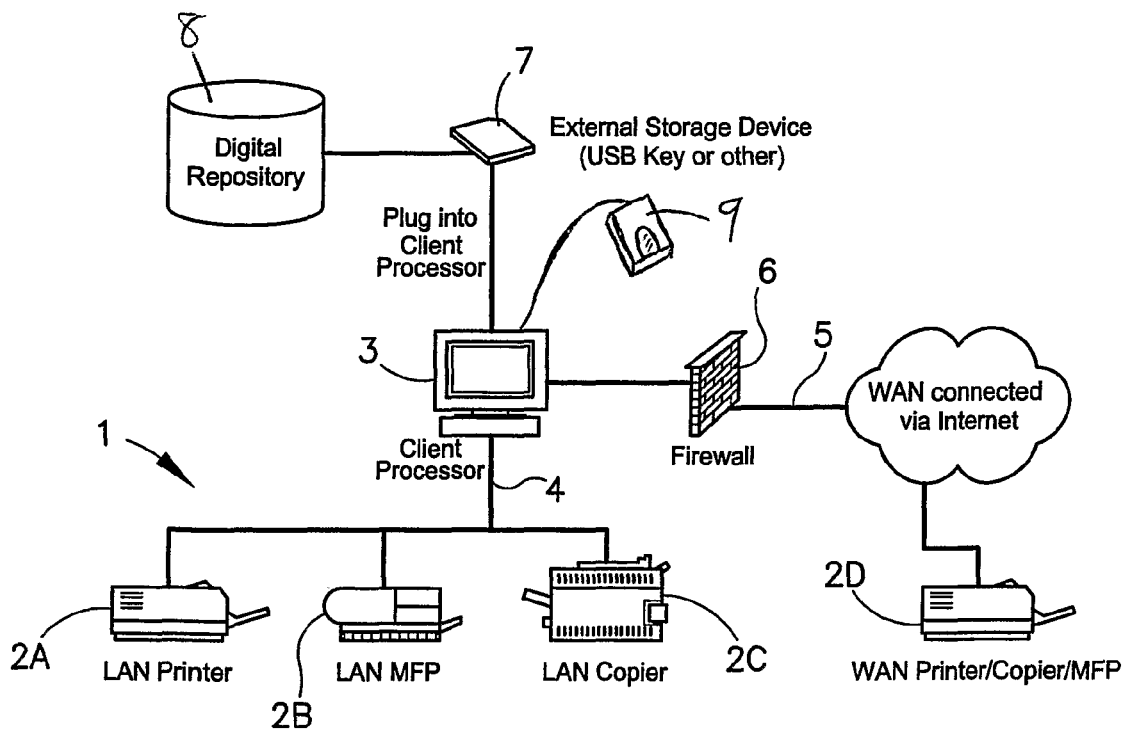
FIG. 1 is a schematic view of a system of the invention.

In its most simplified form showed in FIG. 1, the system comprises:
a) a local network 1 comprising several printing devices 2A,2B,2C,2D each provided with a diagnostic unit for collecting various device working data, and
b) a client local processor 3 connected to the local network 1 via a wired or wireless connection 4 as well as partly via an internet connection 5 with a firewall 6.

In said embodiment, the printing devices are a LAN printer 2A, a LAN Multi function printer 2B, a LAN copier 2C and a WAN printer/copier/Multifunction device 2D.

Preferably, all the printing devices are provided with a diagnostic unit. However, one or more printing devices may not have a diagnostic unit. In this case, the computer controlling the use of the printing device can be used as diagnostic unit for some data.

The local processor can be one specific computer managed by one specific person or group of people, or can be a central computer or a server.

In the embodiment, the local processor is a specific computer 3 including specific instructions for collecting, at least periodically, data from the printing devices 2A,2B,2C,2D and for storing said data on an external and removable data storage device, such as a USB flash drive, USB key, or other storage device provided with a USB port for connecting the storage device with the USB port of the local computer 3.

The storage device 7 connected to the local processor 3 also advantageously includes instructions readable by the processor 3, so as to enable the local processor to execute a program or software when encoding or storing the data from the various printing devices, but also for processing the data so as to edit another or an amended file memory, memory including advantageously at least a part of the history of the file, such as status monitoring report with its history.

When the storage device is provided with the latest data from the printing device, said data can be processed by a computer, for example a computer of the local network, a personal computer possibly adapted for being connected to the local network, a remote computer, for example a computer receiving the data via internet, etc.

In an embodiment, the storage device is a system suitable to be connected directly to one or more printing devices for collecting data from said printing devices. After collecting in several steps, data from the various printing devices, the storage system is connected to a computer or a server for sending the data to a central computer, said computer processing then the data.

When the processing is carried out in a computer connected to the local network, the data and processed data of the printing devices are advantageously placed in a storage device accessible via the local network to one or more authorized people.

When the processing of the data is carried out in a computer not part of the local network, the storage device 7 can be used by a provider of materials for analyzing said data in his computer or in a remote network for analyzing steps to be carried out. The data of the storage device can also be sent to the external computer by internet.

The data as well as the results of their processing in the computer are placed in a digital repository 8 available to authorized people of the local network.

Figure 2:
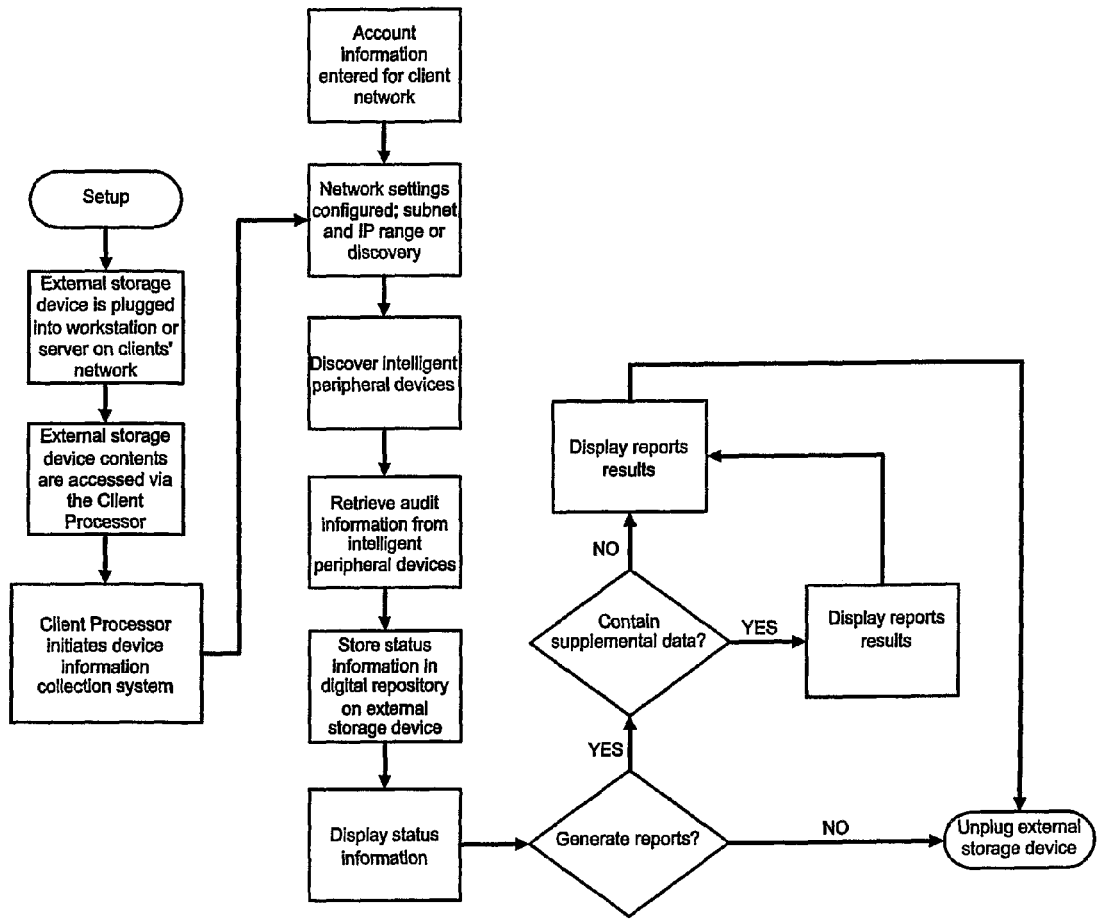
FIG. 2 is a schematic view of a flowchart illustrating a method of the invention.

A method using the system of FIG. 1 is described here below (see FIG. 2). An authorized person or group of people of the client for the local network or an authorized person or group of people for the maintenance of the client's printing device plugs into the client processor 3 a USB key 7.

The client processor reads the content of said USB key 7, so as to initiate a program for searching data from the various printing devices of the local networks. The printing devices each have a diagnostic unit which can be queried or questioned via the local network for obtaining at least some data there from. The program can also search some data relating to the local network as such, for example the location of the printing devices in the local network, the computers of the local network having access to said printing devices.

For example, the diagnostic unit of each printing device includes predetermined data and instructions for determining data suitable to change in function of the use of the printing devices.

The predetermined data are for example a code suitable for identifying the printing device, possibly a code for authorizing access to the content or some functions of the diagnostic unit of the printing device, the date of first use, etc.

Variable data are for example: number of copies (total, daily/weekly), list and number of problems, history, toner indicator (black, color, distinct color, etc.), printing quality, heater's problem, etc.

By initiating the program, data (code of the printer and variable data) are researched and stored on the external store device (USB memory 7). Advantageously, the program includes instructions for processing data received from the printing devices.

The USB memory comprises a digital repository for said data. The access to the program and the data are controlled through two distinct identification protocols. A first identification protocol is used for identifying the authorized person or group of people entitled to initiate the collection of data of the printing devices through the local network. Such an authorized person or group of people can include a specific employee of the company using the printing devices, but can also be a printing device retailer or employees or representatives of a maintenance company. The second identification protocol is used for identifying a person or group of people authorized to consult the database or digital repository 7.

In order to facilitate the access to said database for the authorized people, the data contained in the USB memory is transferred into a memory accessible via internet.

A method suitable to be carried out in the system of FIG. 1 is disclosed here after. The external storage device is plugged into a workstation or a local processor or the server of the local network of client's network.

The contents of the external storage device are accessed via a client processor so as to initiate the program or software contained in the external storage device or so as to initiate an internet communication for connecting a local processor to an external processor with a collecting program or software. For having the access to the content of the external storage device, the introduction of one or more passwords is required. The client processor initiates now the information collection system.

The external storage device may contain security features to protect access to the data, such as requiring submission of a username and password. Such security features may further include one or more biometric security devices, such as a fingerprint scanner 9, that is connected directly to a computer port, such as part of a USB device, or is integrated into another electronic device, such as the external storage device 7. Security may also be enhanced by encrypting communications between various electronic devices, particularly communications that are transmitted over a network, by encryption software stored on the external storage device 7 and executed on the processor 3, with encryption hardware (not shown), or both.

The local network is now defined. For this purpose, the network setting is configured and the subnet and intelligent peripheral range or discovery is initiated. For defining the network setting or the local network configuration, access is made to information encoded by the client as well as account information entered for client network. Said account information are possibly available from the local network or from an external or remote processor via an internet connection.

The program or software searches the intelligent peripheral devices to discover them and to retrieve audit information from the intelligent peripheral devices. Such audit information may include, for example, the number of copies (such as the number of copies made from the latest connection), the content of the toner cartridge, the quality of the printing operation, status of defects and/or problems, etc. The retrieved information or data is stored in a digital repository on the external storage device.

Fields of data associated with each device, such as location, description, and asset number, may also be updated by the software. By applying a filter to the list of discovered devices in an audit, for example, or via manual user selection, a group of devices may have such fields updated as a batch process.

The invention can be used to supplement or entirely replace network diagnostics performed using the simple network management protocol (SNMP) to discover, identify, and receive information from networked devices. This may be accomplished by communicating with embedded web servers (EWS) associated with one or more of the devices. Alternatively, the invention may use the printer job language (PJL) to communicate with one or more of the devices. The information collected by the invention and relating to the networked devices may be supplemental to information gathered via the SNMP, or may be complete without use of the SNMP.

Traditionally, users have had to manage host processor printer driver configurations and changes manually. As a means to automate and dynamically receive configuration updates, the locally installed SNMP application may receive directions provided by another application, such as the program of the present invention or a separate program, signaling what changes to make. The changes are triggered as conditions match, for example, a predefined list of parameters. Such parameters may be related to, for example, device availability, over use, under use, or other conditions defined and that apply to the LAN or WAN network environment. The updates or changes may be available via an external database accessible by a local computer.

A status information is displayed on at least one local computer or on a computer connected to the local network to be analyzed.

An instruction can then be given by the manager or authorized people for achieving a generate report or several reports. If such an instruction is not given, then a message is sent to request to unplug the external storage device. In case such a report or reports are requested, a search is made of other data, such as name of the users, paper consumption or number of copies in function of the time, etc., such as data from one or more local computers. Said supplemental data can be also stored on the external storage device.

When the report is generated, the results thereof are displayed on a screen of a computer of the local network or are printed. Said results can also be stored locally, for example in a memory of a computer of the local network. As soon as the results or report do no more need to be displayed, a message requiring to unplug the external storage device is sent.

The system of FIG. 1 allows a copier, printer, or office products dealer to visit their customers' office and plug in an external storage device into any workstation attached to the clients' network. An application which resides on the external storage device is initiated. No applications are installed on the clients' network. The applications initial interface provides options to specify numerous (limited to device storage capability) client accounts. The accounts are used to organize the client information and audit history.

An account is selected and network settings are specified either manually by entering in IP ranges, subnets or performing a network discovery that automatically detects the LAN and WAN network settings of the client network.

An audit is initiated that performs an asset discovery of intelligent peripherals which include copiers, printers and MFP devices. The intelligent peripherals are further audited to extracts up to 28 different fields of information. The audit information is stored it in a digital repository on external storage device and displayed when complete.

The first time the audit process is performed, it provides a baseline of life meters, toner coverage and device identifiable information for the intelligent peripheral devices connected to the Client network.

The external storage device contains reports which may be initiated on the clients' site, or another location. The reports display results of the audit information combined with static intelligent device attributes which are retrieved via XML from a storage device hosted in another location via the internet.

The external storage device when unplugged contains all audit information. No information remains on the client network. The initial asset discovery is used to analyze the existing intelligent peripheral devices and alternate consumables or hardware replacements.

By performing a second discovery on a future date and comparing the differences in the initial and new device information meters, the volumes are extracted for that period of time. Combined with the device identifiable information, and supplemental data, a cost-per-page and total-cost-of-ownership may be calculated, along with the return-on-investment (cost savings) if the alternate consumables and/or hardware are rolled out.

Furthermore, when the results from two audits performed at different times are compared, devices which are discovered in the first audit and not the second audit, or vice versa, are filtered and flagged as ignored devices. The existence of flagged devices signals to a device dealer or other person that the devices discovered in the first audit which are not included in the second audit were likely removed from the network, and that devices which were discovered in the second audit but not in the first audit were most likely added to the network.

An analysis of each device's monthly volume includes determining whether the device is over utilized or under utilized. The manufacturer of each device publishes a maximum duty cycle associated with the device and which is used to define two thresholds, an "under" threshold and an "over" threshold. The maximum duty cycle associated with each device may be stored, for example, in an external storage database accessible via a computer network, such as the Internet. Both the under threshold and the over threshold are values represented as a percentage of the maximum duty cycle—such as, for example, 70% and 90%. If the actual monthly volume or duty cycle of a device, as a percentage of the maximum duty cycle, is less than the under threshold, the device is said to be under utilized. If the actual monthly duty cycle is more than the over threshold, the device is said to be over utilized.

Some printers, such as various printers manufactured by HEWLETT PACKARD™, report toner coverage values in raw format. In other words, the number reported by the printers represents the sum of the lifetime pages multiplied by the toner coverage for each page multiplied by a scaling factor. These raw values are available in 2 forms, either "coverage sum" or "coverage sum squared." During the process of obtaining these values and before writing the values to the database, a reverse scaling factor is applied. To use the raw values for analysis, an algorithm must be applied that turns the raw numbers into values represented as a percent from 0% to 100%.

Other printers report coverage values as actual values, as opposed to raw values, but only the coverage sum squared is scaled. In these cases, prior to using these values for analysis, a reverse scale must be applied to convert the values back to raw values. The reverse scale is applied according to the following algorithm:
  a) determine whether each printer record originated from a printer that reports coverage values in raw format, if it did not, skip it;
  b) If the record did originate from a printer that reports them in raw format, calculate the average coverage and average coverage squared as follows:
    a. Average coverage=coverage sum/total pages
    b. Average coverage squared=coverage sum squared/total pages
  c) If (average coverage)<1 and (the square root of the average coverage squared)>(average coverage×8), assume the results are incorrect and fix the coverage values for the printer as follows:
    a. Coverage sum=coverage sum×100
    b. Coverage sum squared=coverage sum squared×100

The foregoing algorithm relies on the coverage sum squared value to identify printers with incorrect scaling since this value is more sensitive to erroneous variations than the coverage sum.

The portion of the software operable to extract fields of information from each networked device may be dynamically customized for the purpose of extracting additional fields of information from each device during an audit. In other words, without recompiling and maintaining synchronous versions or releasing a complete new version of the software, additional parameters may be added to support additional fields of information that may be extracted from each device. Thus, the end user may restrict or increase the fields of information extracted from each device.

Software components produced by third parties may be distributed from the external storage device or along with software of the present invention to be installed on an end user's computer. This would eliminate the need to install the third-party software separately or prior to use of the application.

Figure 3:
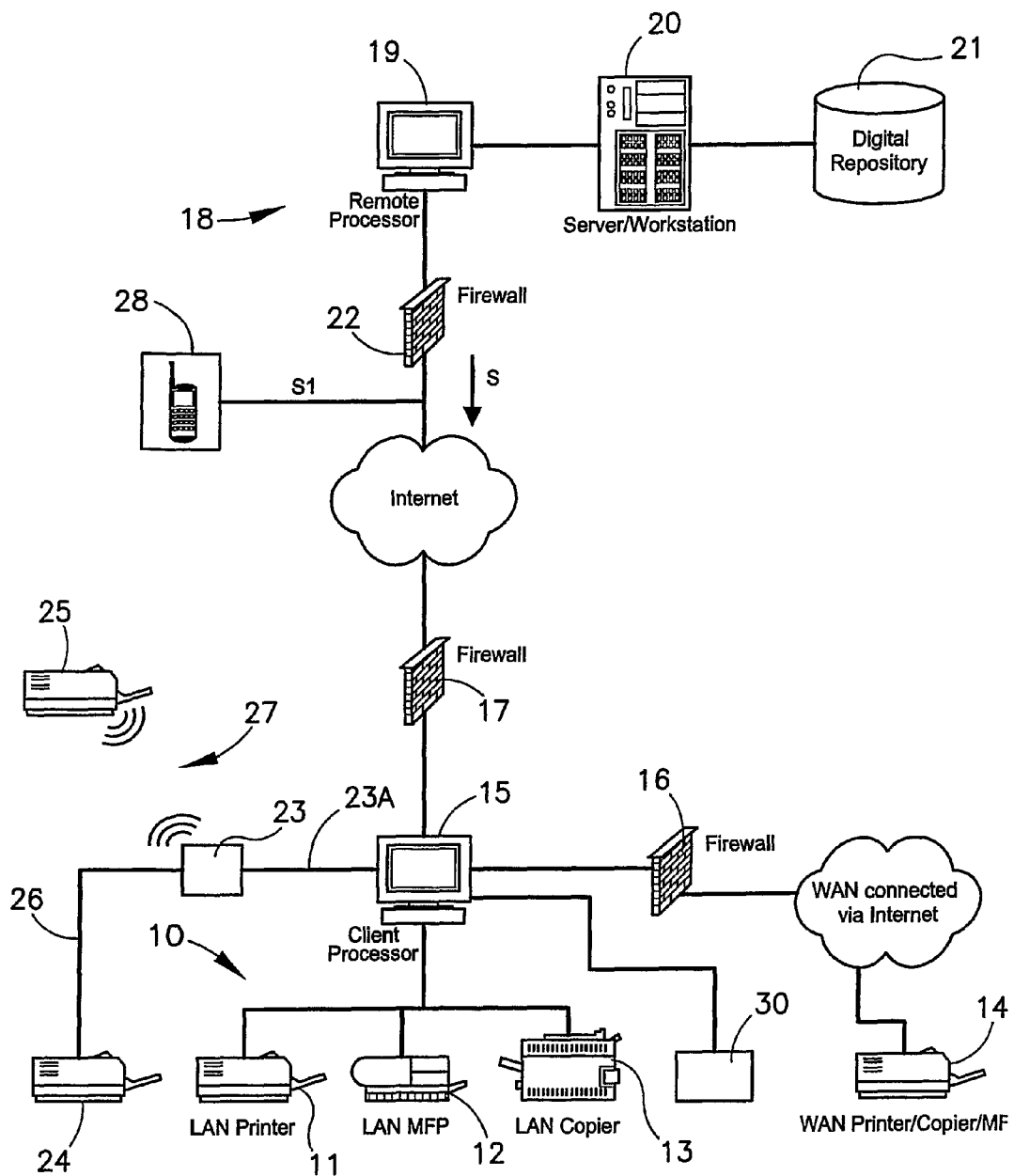
FIG. 3 is a schematic view of another system of the invention.

FIG. 3 is another schematic view of a system of the invention. The system of FIG. 3 comprises:
  a) a local network unit 10 comprising:
    several printing devices 11,12,13,14 comprising each a diagnostic unit collecting various device working data, said printing devices being connected to one or more local processors 15 managed by one or more managing peoples, especially a managing people having to control or manage the furniture or maintenance necessary for the printing devices, and
    a first communication server, said server being for example integrated in the local processor, whereby said server is adapted for connecting with interposition of firewall system or instructions 16,17, via internet with a printing device 14 or with a remote network 18, and
  b) a remote network unit 18 comprising at least:
    a remote processor 19,
    a firewall system 22, and
    a second communication server (in the form of a part of the remote processor 18) adapted for communicating with the first communication server or client processor 15 so as to receive data from the first communication server or client processor 15 and so as to send at least data and program instructions to the first communication server or client processor 15.

The remote network further comprises a server/workstation 20 forming the link with a digital repository 21.

Figure 4:
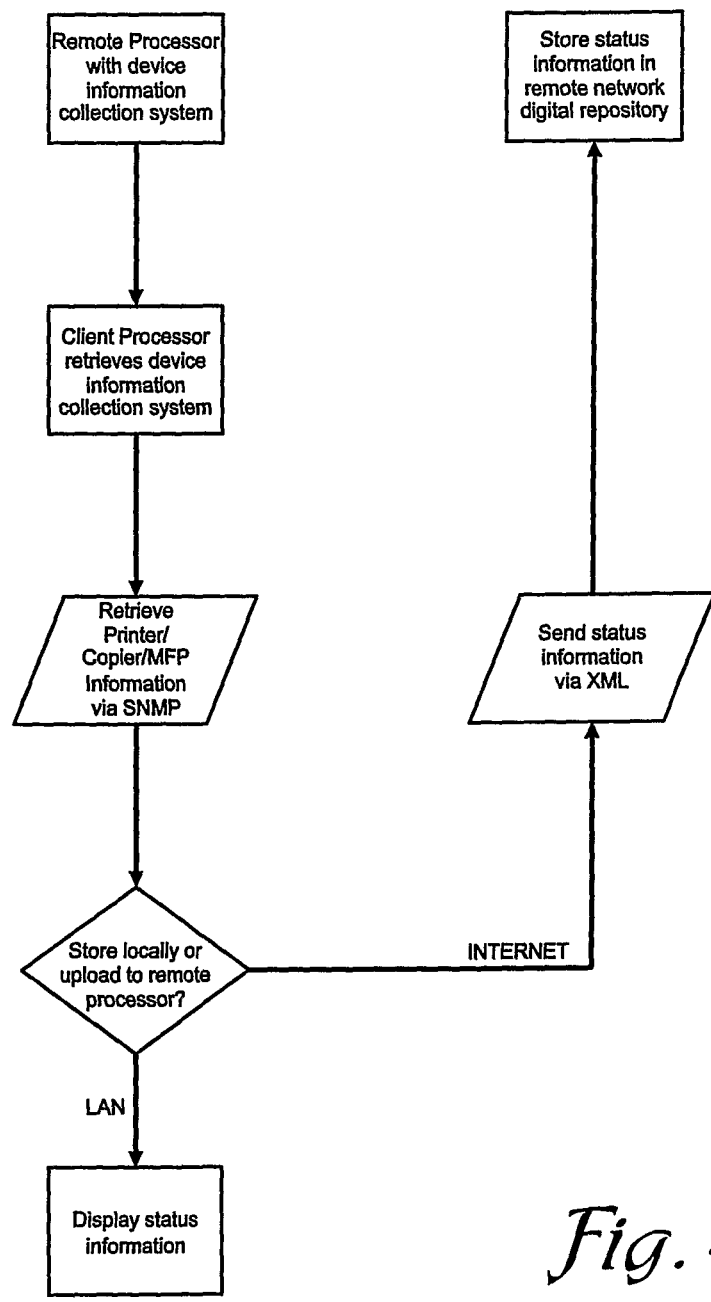
FIG. 4 is a schematic view of a flowchart illustrating a method of the invention when using the system of FIG. 3.

FIG. 4 is an abridged method implemented by the system of FIG. 3.

Figure 5A:
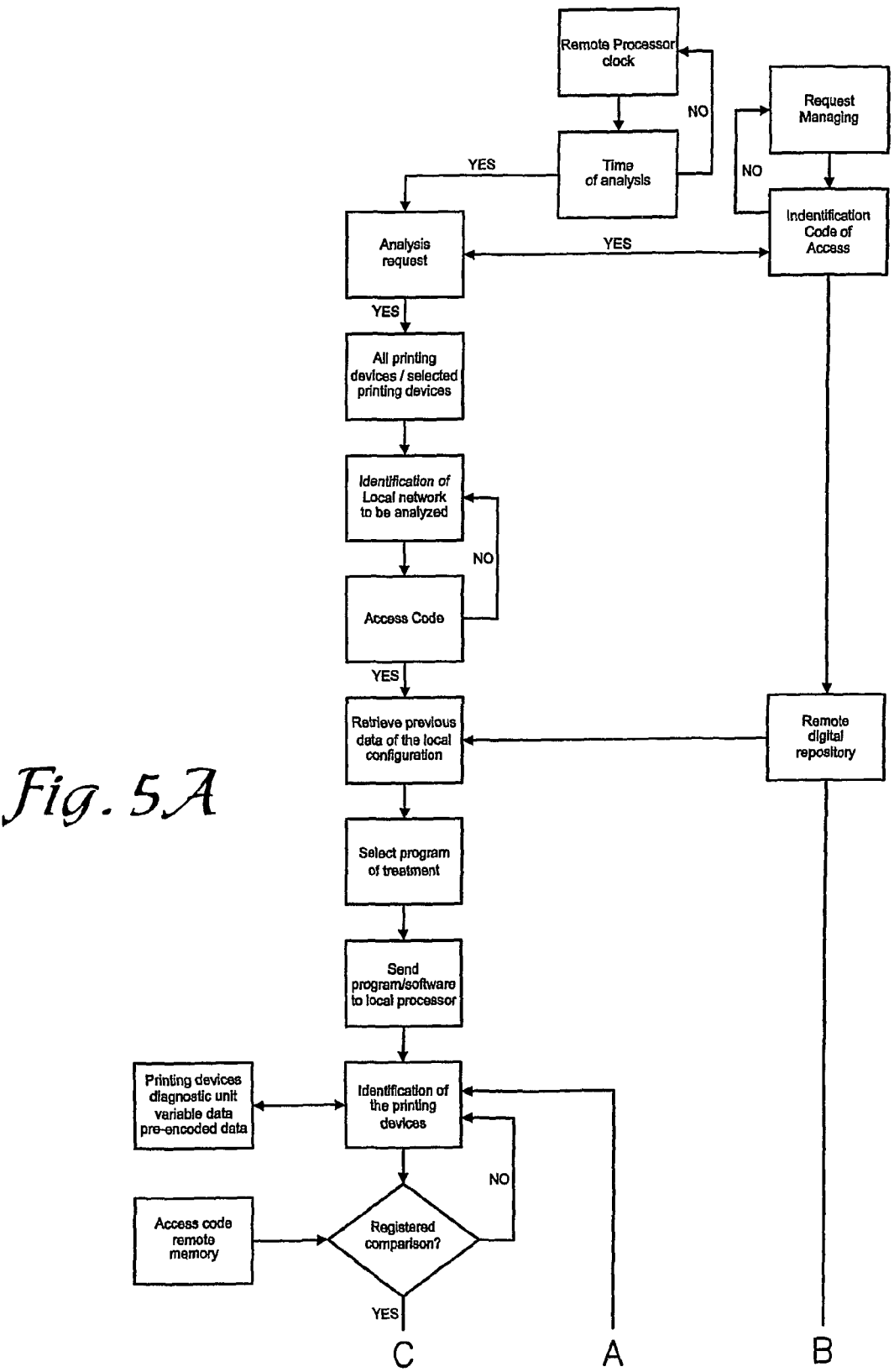
FIGS. 5A and 5B are schematic views of details of the method and system of the invention according to FIGS. 3 and 4.
Figure 5B:
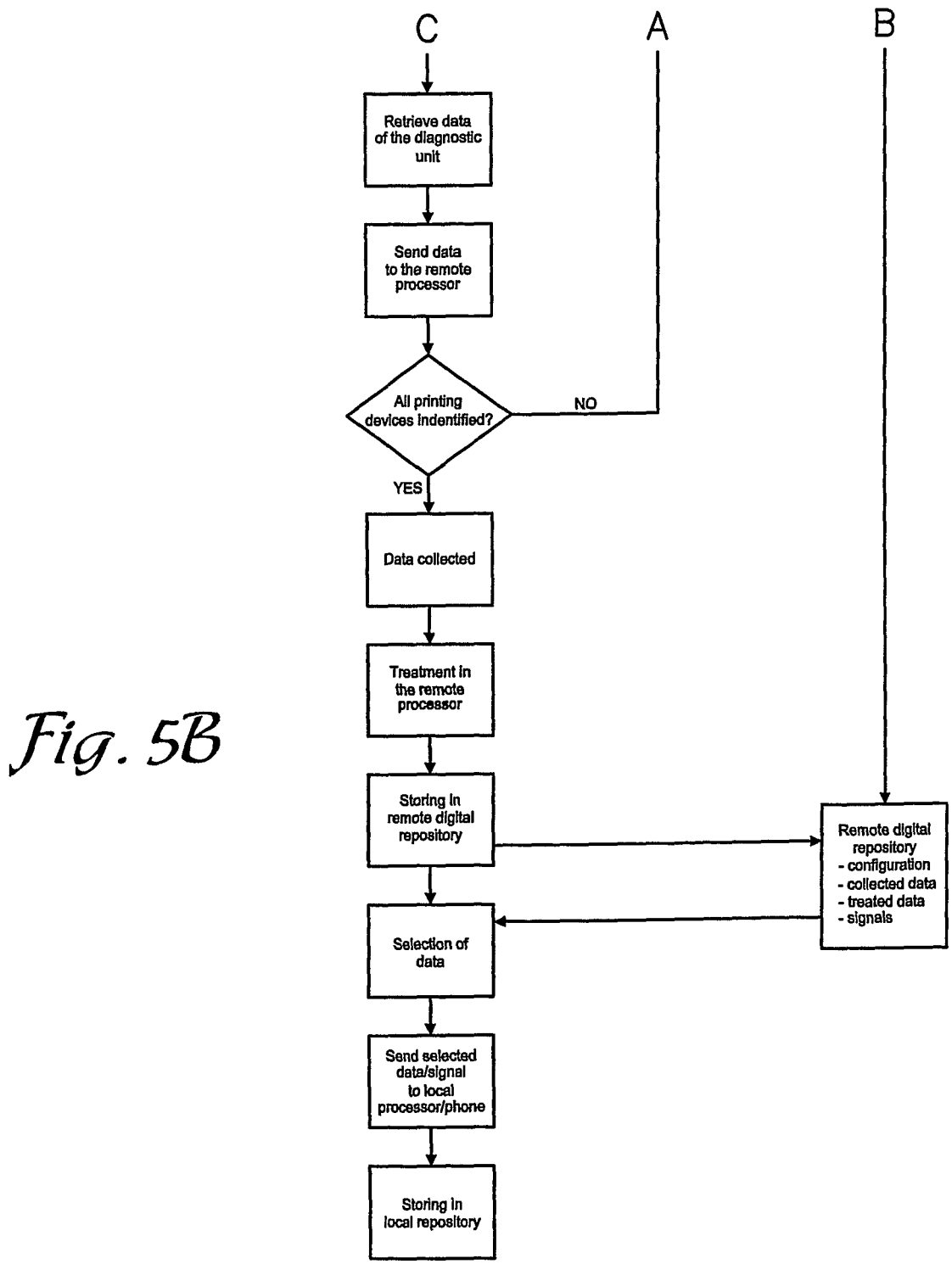

FIGS. 5A and 5B are more detailed view of a flow chart explaining a method of the invention with the system of FIG. 3.

The remote processor 19 includes instructions for collecting data from the diagnostic unit, and instructions for processing at least some data from the diagnostic unit so as to emit a signal or a message S, whereby the emitted signal or message S is in a form accessible to said at least one managing people, such as a people responsible for the local network, someone responsible for the maintenance, someone responsible of stocks, such as for paper, toner, etc. The sending of said message or signal is for example made via internet.

The printing devices are connected to a client processor 15 via a wire connection and an internet connection. In a possible embodiment, the client processor is associated (via the wire connection 23A) to a first communication server 23 which is in direct communication with printing devices 24,25 by a connection selected from the group consisting of wires or fibers 26 and wireless connections 27.

The remote processor can then possibly send directly for example a signal to the printing devices 24,25 through the server 23 for receiving back data from said printing devices, without having to pass through the local processor 15.

After processing in the remote processor 19, data or signals S1 are sent to the managing people(s), for example on a processor, personal computer, cell phone 28, etc. When a signal is sent on a cell phone, the signal has advantageously the form of a message indicating the managing people or the responsible to consult an internet site for having access to data and remarks relating to one or more printing devices, i.e., monitoring status and history thereof.

The local network unit 10 comprises a local processor 15 between the printing devices and the first communication server (part of the local processor), said local processor 15 including instructions for processing at least some data from the diagnostic unit in at least one processed data, and instructions for sending said processed data through the first communication server to the second communication server. Data's are directly accessible to authorized people(s) of the local network. When the local processor 15 receives signals and processed data from the remote network or processor 19, said signals or data are also advantageously stored, so as to be also accessible to authorized people of the local network after the end of the communication between the processors.

The diagnostic unit of the printing devices is adapted for collecting at least one working or variable data, preferably several working data selected from the group consisting of data relating to a life-time meter read, data relating to a mono meter read, data relating to a color meter read, data relating to a printer pages meter read, data relating to a fax pages meter read, data relating to a copy pages meter read, data relating to a list pages meter read, data relating to a life-time scan meter read, data relating to a fax scan meter read, data relating to a copy scan meter read, data relating to a scan to network processor meter read, data relating to an email scan meter read, data relating to toner coverage read, data relating to low paper indicator, data relating to no paper indicator, data relating to low toner indicator, data relating to no toner indicator, data relating to door open indicator, data relating to a jammed indicator, data relating to an offline indicator, data relating to a service requested indicator, and combinations thereof.

The diagnostic unit further comprises at least one data relating to the device, preferably several data selected from the group consisting of data relating to device identifier, data relating to the manufacturer of the device, data relating to the model of the device, data relating to the serial number of the device, data relating to a network address of the device, data relating to a description of the device, data relating to the location of the device, and combination thereof. Said data are for example pre-encoded data suitable for identifying the printing device, its location in the local network 10, etc.

The remote processor 19 includes identification instructions so as to collect data from diagnostic unit of registered devices. For each device, the remote processor includes instructions for comparing at least two data stored in a remote memory selected from the group consisting of device identifier, data relating to the serial number of the device, data relating to a network address of the device, data relating to a description of the device, data relating to the location of the device, and combination thereof, with data from the diagnostic unit. For said identification, the local network is first identified, for example by a code of access to be encoded by a manager of the local network. When the local network is retrieved by the remote processor 19, the remote processor research in the digital repository 21 details and characteristics of the local network 10 according to the prior data processing.

After receiving data from the various printing devices, the remote processor includes instructions for processing said data so as to achieve processed data and signals to be emitted, for determining whether or not a signal needs to be emitted, such as a warning signal, for storing in at least one remote digital repository or memory, various data such as collected data, data resulting from a processing of collected data, emitted signals, etc.

The local network comprises a memory or digital repository 30 for storing collected data from the diagnostic unit, processed data, emitted signals, status report (especially abridged report), etc. Such a local digital repository enables a quick access to data, preferably condensed data.

The remote processor includes then advantageously instructions for storing selected data in the local digital repository, for example mean paper consumption, mean toner consumption, date of next analysis for the local network, date of next maintenance, etc.

The remote processor includes also:
  instructions for sending periodically a signal to the printing devices through the second and first communication servers for receiving data from the diagnostic unit of said device, for said purpose the computer 19 is associated for example with a time mechanism (such as a clock system) or includes instructions relating to a time measurement or determination, and
  instructions for sending periodically a signal to a plurality of printing devices (for example selected printing devices) of a same local network through the second and first communication servers for receiving data from the diagnostic unit of said device, and
  instructions for sending periodically a signal to a local processor through the second and first communication servers for receiving data from the diagnostic unit of at least one device in communication with said local processor, and
  instructions for sending periodically a signal to a group of local processors through the second and first communication servers for receiving data from the diagnostic unit of a plurality of devices in communication with at least one local processor of said group of local processors, and
  instructions for authorizing access to the storage memory by a managing people through a communicating channel, and
  instructions for identifying or authenticating the managing people and for authorizing access to the data of the storage memory relating to devices in management by said managing people.

The processing to be operated by the remote processor can also be activated by the sending of a signal by an authorized people to the remote processor. For enabling said required processing, the identification of the authorized managing people is carried out, for example by asking an access code to be encoded. Such a request can be made by phone or cell phone. In case the access code is not correct, a message is sent back to the user.

The remote processor includes for example readable instructions comprising at least one characteristic selected from the group consisting of a dynamic link library, a static link library, a script, a JAVA class, a .NET class, a C++ class, a .NET library routine, and combinations thereof.

In the embodiment of FIG. 3, the system is configured for storing data in a first digital repository 21 through an open database connectivity interface, and in a second digital repository 30 of the local network unit.

The local network comprises at least one local processor, and the remote processor includes instructions for sending a software or program through the second communication server and the first communication server to at least one local processor, whereby said local processor includes instructions for storing said software or program in a local memory. The sending of the program or software or portion thereof is carried out after identifying the local network 10 to be analyzed. Indeed, in function of the local network, of its complexity, of the services to be provided for a specific local network, the remote processor will select one or another program or software to be used.

The remote processor includes instructions for carrying at least one determination selected from the group consisting of data relating to alternating consumables, data relating to replacements, future data, cost related data, etc., these data being processed data.

The working step by the system of FIG. 3 can be initiated from a removable storage device for the purpose of device monitoring and rapid print assessment. The removable storage device is for example plugged to the local network or into the local processor 15. The removable storage device includes computer readable instructions and data. The local processor reads then the instructions of the removable storage device for initiating the analysis process. The system is then configured so as act as a information collection system for collecting information and data from one or more printing devices, preferably intelligent printing devices, connected to the local network (local area and/or wide area, the wide area being for example connected via an internet connection) using for example a network management protocol. The system is also configured to store collected data in a digital repository of the removable storage device, and store collected data in a digital repository connected to the remote network with a remote processor. The system is further configured for retrieving historical status information from the digital repository located on the removable storage device and/or on the digital repository of the remote network, and for reporting device monitoring status, such as device monitoring status differences for consecutive date and time combinations.

Software may also be installed at an end-user's location, such as on the client processor 15, which will perform daily audits and update audit information each day and communicate the information to a remote location, thereby providing the latest meters. This is especially useful where a device is removed from or added to a network between scheduled maintenance visits where certain information, such as number of copies during the previous visit, is not available. Furthermore, this would allow the information to be collected even if a network machine were down during a scheduled visit or there were network communication problems.

The software installed at an end-user's location may filter the outgoing information by specifying inclusion and exclusion parameters and to what data fields these filters apply. Such filters could serve to limit the communicated information to only that information that is related to network devices of a particular dealer, and could serve to restrict communication of information relating to devices that contain confidential or restricted information.

An external database may be dedicated to containing device information, wherein a computer, such as client processor 15 or remote processor 19, communicates with the database via a secured network connection to match device models discovered during an audit and to obtain information about the devices, such as monthly duty cycle, consumable costs, and so forth. The external database may reside in the digital repository 21, the server 20, or other hardware dedicated to providing a device information database. It is contemplated that such an external database would contain up to 10,000 device models with 120 or more fields of information pertaining to each device model.

Missing or empty fields of the external database may be submitted by, or on behalf of, the user attempting to access the data. Such fields may be added to a temporary location and will be available only to the person or company submitting them. The newly-submitted data may be validated by a person at a remote host location, and posted to the external database for public access.

An external database may also include information submitted by a dealer that is specific to particular networked devices, such as specific replacement part numbers and associated costs. Such a database would centralize specific device data to avoid repetitive data entry, and would enable timely generation of account reports. The database may also be accessed during the process of discovering and analyzing networked devices so that the replacement part and cost information may be associated with the devices at that time.

Figure 6:
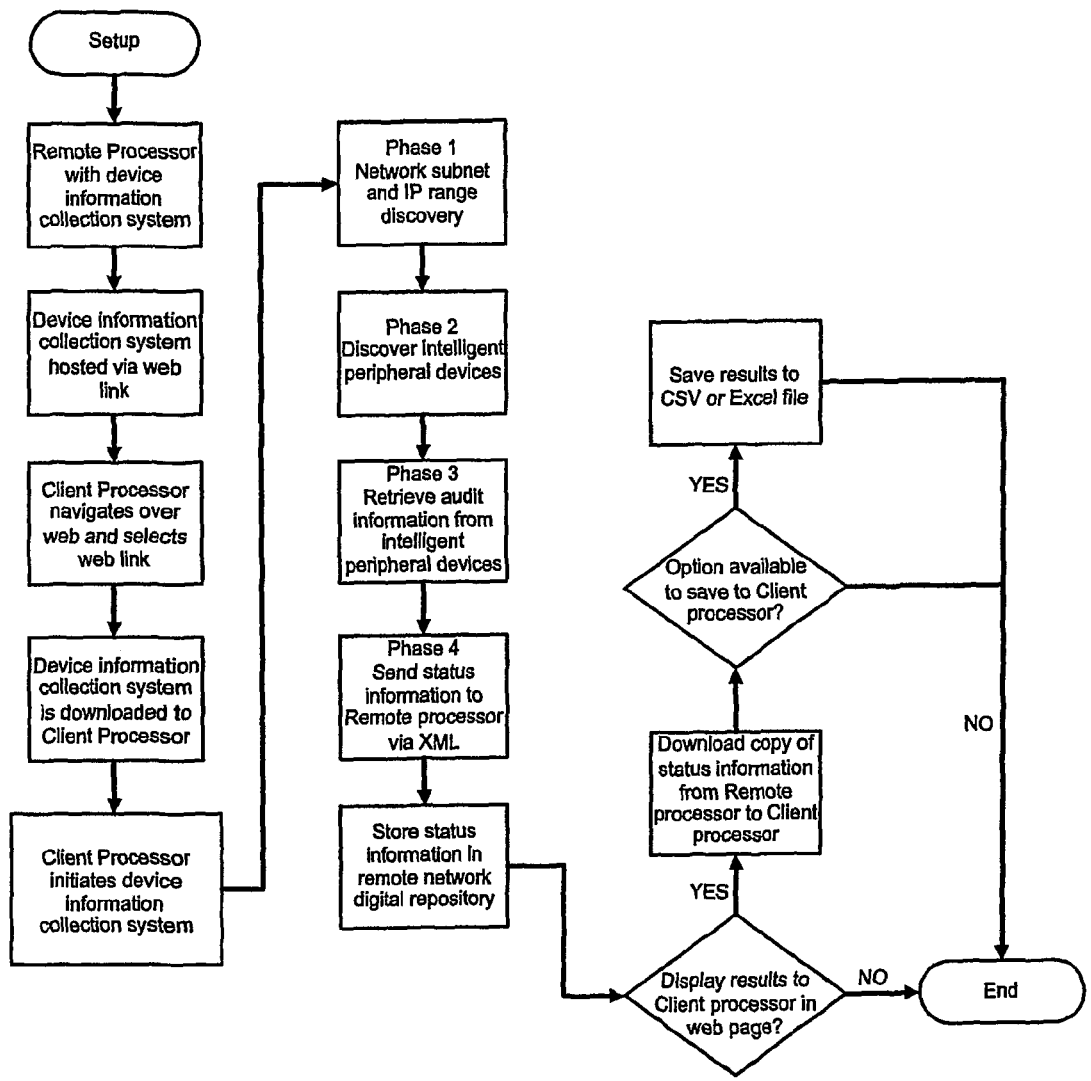
FIG. 6 is a view of a flowchart illustrating another method with the system of FIG. 3.

FIG. 6 is another flow chart of a method suitable to be applied with the system of FIG. 3.

The method allows customers of a copier, printer, or office products dealer to navigate to their web site and click a link. The link initiates an application download to the Client Processor. When the download is complete, it initiates an application on the Client Processor that performs functions in multiple phases.

Phase 1 automatically detects the LAN and WAN network settings of the Client network. Phase 2 uses these results to initiate an asset discovery of intelligent peripherals which include copiers, printers and MFP devices. Phase 3 further audits the intelligent peripherals and extracts up to 28 different fields of information. Phase 4 sends the audit information via XML over the internet back to the Remote Processor and which stores it in a digital repository on the remote network.

The first time the WebAudit process is performed, it provides a baseline of life meters, toner coverage and device identifiable information for the intelligent peripheral devices connected to the Client network.

If configured the Client Processor is prompted whether to view the results of the audit. If the Client Processor requests the view, a copy is hosted by the Remote Processor in a web page that is viewable by the Client Processor. If configured the Client Processor is prompted whether to save the results of the audit. If the Client Process requests to save, a copy is exported to either CSV or Excel file format and saved to the Client Processors local network storage.

Reports hosted on the Remote Processor may be initiated to display results of the audit information combined with static intelligent device attributes which are retrieved via XML from a storage device hosted in another location via the internet. The initial asset discovery is used to analyze the existing intelligent peripheral devices and alternate consumables or hardware replacements.

By performing a second discovery on a future date and comparing the differences in the initial and new device information meters, the volumes are extracted for that period of time. Combined with the device identifiable information, and supplemental data, a cost-per-page and total-cost-of-ownership may be calculated, along with the return-on-investment (cost savings) if the alternate consumables and/or hardware are rolled out.

The audit can thus also establish reports on the date/time of printing, the type of papers, the number of pages, the reference or name of document printed, the identity of the person requesting the printing, his department, etc.

The invention further relates to a connecting device adapted for ensuring a connection between one or more printing devices and one or more local processors, for monitoring and rapid assessment of the local printing devices.

Figure 7:
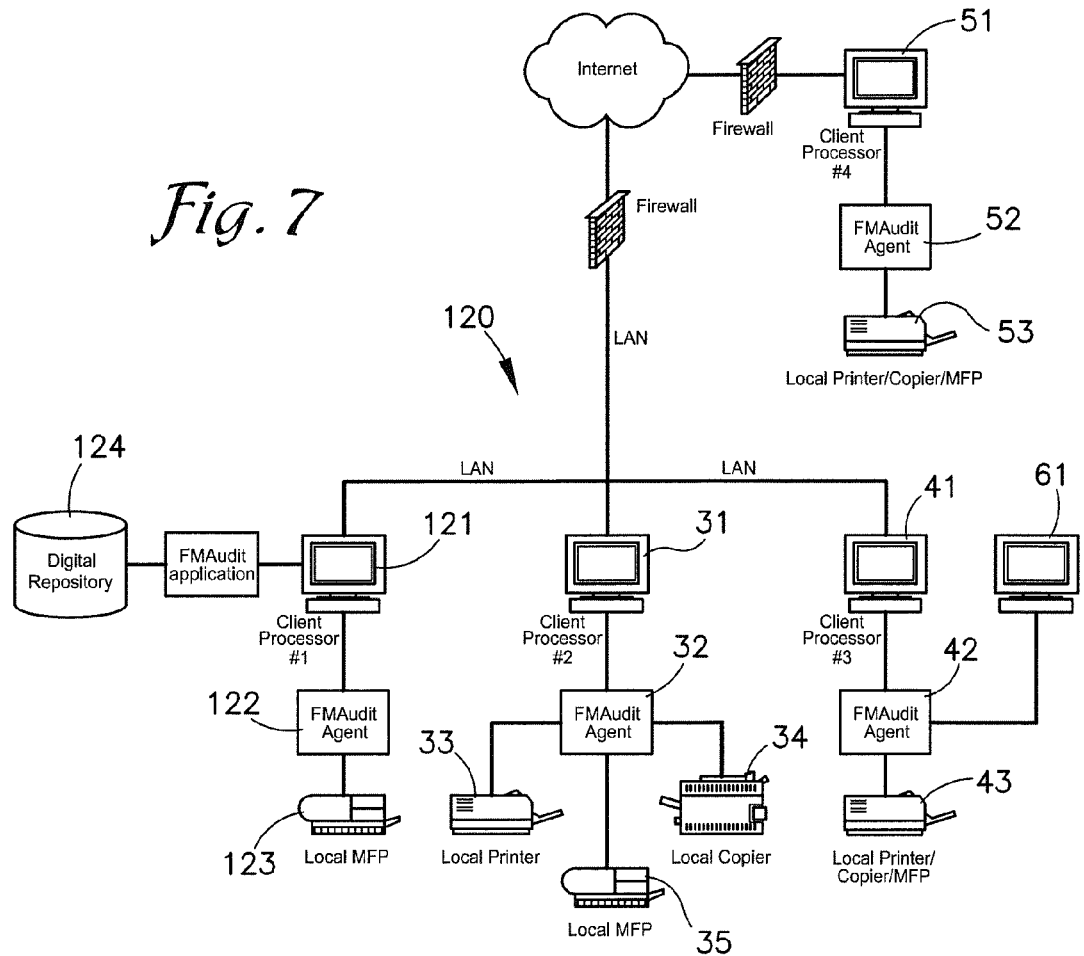
FIG. 7 is a schematic view of a network provided with a connecting device of the invention.
Figure 8:
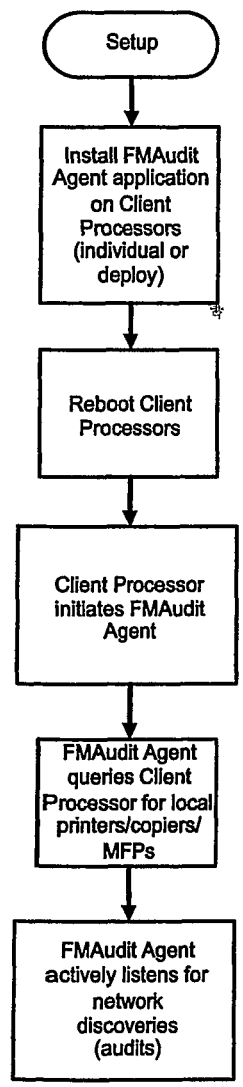
FIG. 8 is a flow chart of a method of the invention using a local connecting device.

The local network 120 of FIG. 7 comprises:

- a local processor (client processor) 121 communicating through a computer implemented agent or connecting device 122 with the printing device 123, i.e. a Multi Function Printer;
- a local or client processor 31 communicating through a computer implemented agent or connecting device 32 with several printing devices 33,34,35, namely a local printer, a local copier and a Multi Function Printer;
- a local or client processor 41 communicating through a computer implemented agent or connecting device 42 with the printing device 43, i.e. a local printer/copier/Multi Function Printer (MFP); and
- a local or client processor 51 communicating through a computer implemented agent or connecting device 52 with the local printer/copier/MFP 53, i.e. a Multi Function Printer.

The client processors 121,31,41 are connected the one to the other via a local area network LAN, while the client processor 51 is connected to the Local Area Network (LAN) through the internet. Client processor 51 is part of the wide area network. Firewall protection are provided for protecting the client processor 51 as well as the Local Area network LAN.

The connecting devices 122,32,42,52 are provided with two type of ports, namely ports for connecting one or more printing devices, and ports for connecting one or more client processors, and possibly further port for connecting remote processors, etc.

The connecting device 32 is provided with three different ports for connecting the device 32 to three different printing devices. The connecting device 42 is provided with one port for the local printer/copier/MFP 43 and with two ports for the client processor 41 and the local processor 61. A same printer is used for two different processors, i.e. users.

One selected client processor is used as main processor for the audit of the printers. For example, said main processor is processor 121 in connection with the other processors and thus with the other connecting devices 122,32,42,52 through the local network LAN. Said main processor is used for installing software (FMAudit application) for determining a status report of the various printers, as well as a general status report of the printers. Said main processor 121 is connected to a digital repository or database 124.

Each local processor is connected via a plug system to a local connecting device (122,32,42,52) to one or more printers. During said plug-in, instructions will be given to the manager of the local processor for entering one or more characteristic, such as selection of the printer, selection of the main local processor, etc.

Each connecting device 122,32,42,52 comprises readable instructions which when read and installed (partly or completely) are suitable each for collecting information of the printing device(s) attached to the considered connecting device, and for storing at least part of the collected data in the digital repository via the Local Area Network and via the Wide Area Network and the Local Area Network for the device 52.

Each connecting device are advantageously provided with monitoring instructions, so as to enable each local processor to monitor the status of the local printers to which the local processor is attached.

The main local processor 121, adapted to be managed by specific authorized people, is provided with instructions for monitoring general status of the printers of the global network.

The connecting device 122 is provided with instructions for installing a software or an application, advantageously incorporated in the connecting device, such as in a memory, for monitoring the status of the printers not directly connected to the processor 121. After plug in the connecting device 122, the "setup" of the software is started on the processor 121. The program is installed. After said installation being completed, the processor 121 is rebooted so as to initialize the working of the general status software, as well as the monitoring and storing software to be applied for the data from the local MFP printer 123. The general program requires from the client to identify the printers to be monitored. When the general program is working, the main processor 121 listens the Local Area Networks for collecting data of copiers coming from the client processors 31,41,51 so as to store said data in the digital repository 124.

Figure 9:
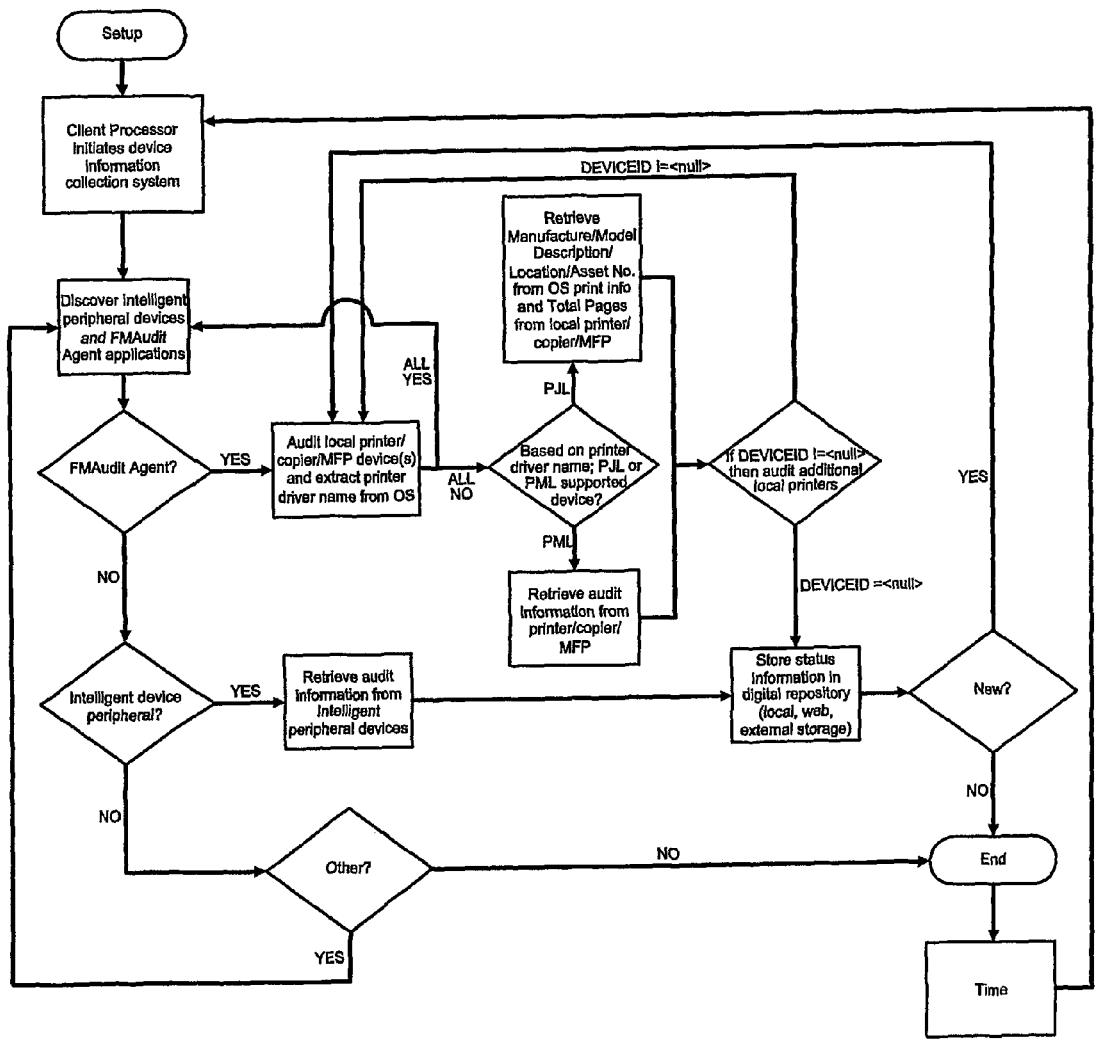
FIGS. 9 and 10 are flow charts representing a possible working of the method of the invention.

FIG. 9 is a schematic flow chart of a method implemented by using a connecting device of the invention. The connecting device is plugged in the client or local processor, while one or more printers is plugged in the connecting device. The local processor initiates the program for collecting data and for storing the data. The processor searches the intelligent peripheral devices and printers, as well as the other peripheral connecting devices connected to local processor.

When the local processor retrieve a peripheral device, the processor determines whether said device is a connecting device of the invention. If not, the processor determines whether the device is an intelligent peripheral printer. If not, no data from said peripheral printer is collected. If other intelligent peripheral devices exist, the retrieve step is carried again. If all the intelligent peripheral devices have been retrieved, the program is ended. If yes, audit data from the intelligent device are collected and stored in the digital repository. Possibly some data are processed by a status software so as to edit report or signals, such as warnings.

If the local processor determines that the peripheral is a connecting device of the invention (FMAudit Agent), the local processor determines the printing devices attached to said connecting device and extracts the printer driver name from the operating system OS. Based on the printer driver name, the port language (PJL or PML) to be used is selected.

If the PML language is to be used, the processor retrieve audit information/data from the printing device. If the language to be used is PJL, the processor retrieves data (manufacturer, model, description, asset number, etc.) from the operating system and data (such as number of pages) from the printing device The retrieved data are checked. If no additional audit data are retrieved, the processor will search additional printers attached to the local connecting device or for new intelligent peripheral devices (connecting devices), if the data of all the printers connected to the analyzed connecting device have been retrieved.

If new data or additional data('s) have been retrieved, said data('s) are stored in the digital repository. The processor start then a further search of a printer attached to the analyzed connecting device, if the data of all the printers have not been collected and retrieved.

When all the data have been collected and retrieved for all the printers or printing devices, the program is stopped, for example for a specific time period. When a specific action or time occurs, the program is started again for collecting/retrieving back data from the printer.

Figure 10:
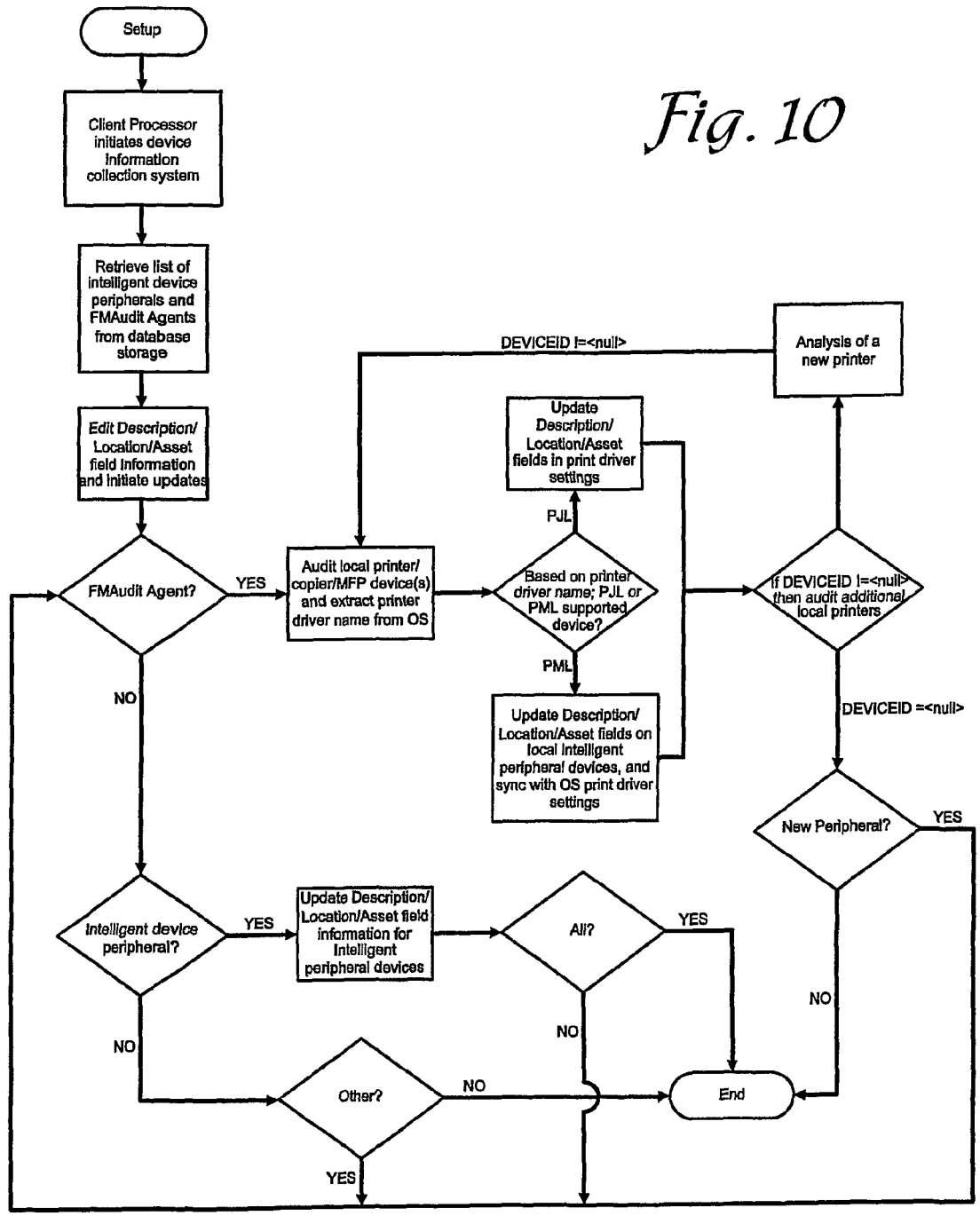

FIG. 10 is a view similar to FIG. 9, but for updating the intelligent device peripherals to be analyzed. The connecting device is plugged in the client or local processor, while one or more printers is plugged in the connecting device. The local processor initiates the program for collecting data and for storing the data. The processor searches the intelligent peripheral devices and printers, as well as the other peripheral connecting devices connected to local processor.

The local processor edits a description, the location, the asset field information and initiates an updating. The processor edits a list of retrieved intelligent devices to be analyzed. For the retrieved peripheral devices, the processor determines whether said device is a connecting device of the invention. If not, the processor determines whether the device is an intelligent peripheral printer. If not, no data from said peripheral printer is collected. If one or more other intelligent peripheral devices have to be analyzed, the analysis step is carried again. If all the intelligent peripheral devices have been analyzed, the program is ended. If yes, instructions are given for updating the description/location/asset field of the peripheral device. If all the peripheral devices have been analyzed, the program is stopped, otherwise a new peripheral device is analyzed.

If the analyzed peripheral device is a connecting device of the invention (FMAudit Agent), all the printing devices attached to said connecting device are retrieved and the printer driver name is extracted from the operating system OS.

Based on the printer driver name, the port language (PJL or PML) to be used is selected. If the PML language is to be used, the processor updates information/data for the printer and synchronizes said data with the data of the OS print driver setting. If the language to be used is PJL, the processor updates data (manufacturer, model, description, asset number, etc.) in the printer driver setting.

The further updating is checked. If no additional updating of a printer attached to a connecting device is required, another intelligent peripheral device is analyzed. When all the peripheral devices are analyzed, the updating program is ended.

As shown in the figures, the FMAudit Agent or device provides thus the information collection on a locally attached printer, copier or MFP device. Supporting FMAudit Viewer, Onsite or WebAudit, the locally attached device information supplements the networked device information during a device monitoring or rapid print assessment audit.

The Agent or device is a bridge between the LAN/WAN network and local printers. Without an application installed on the computers, the local printers have no way to respond to network audits performed using an SNMP solution. The Agent or device must be deployed (pushed) to any computers with locally attached devices. In some case, the device can be directly mounted on a local processor and can be sell together with the processor.

When the computer is booted up, or any changes are made to the locally attached device configurations, the Agent or device, via the processor, queries the operating system and assigns each device a unique node on its proprietary MIB tree. The Agent MIB tree is advantageously based on a proprietary root OID of 1.3.6.1.4.1.21866, assigned by Internet Assigned Numbers Authority (IANA), and registered under FMAudit, LLC. (Incorporated in Missouri, US).

The Agent or device sits idle until an audit is performed on the local or wide area network. At that time it replies to the FMAudit Viewer, Onsite, WebAudit or 3$^{rd}$ party approved application and proceeds to extract the information from the operating system and the locally attached devices. The SNMP requests are dynamically translated to either PJL or PML. The source of the information depends on whether the device supports PJL or PML. Only newer HP devices support PML at this time. PML provides far more information directly from the printer. The information provided by PML supported devices includes every field as if the device were physically networked.

The Agent or device will query via the processor each device until there are no more to query. If the device does not support PJL or PML, the results will only include identifiable fields which are extracted from the operating system.

In the past, there have been other similar solutions that query devices over the computer local ports, but they have never included a multi-tiered MIB tree, allowing an SNMP based management application to query it dynamically during an audit as if it were a networked device. The previous applications would query the local ports on a set schedule (or manually initiated) and compile the information in a database. The results would therefore not be real-time. There has never been a solution available that supports PML communication with local devices, only PJL.

FMAudit Agent or device contains comprehensive support for any computer port type so all local printers will be included in an audit. This has been a major limitation of other previous solutions that only support 1 or 2 port types, out of 5 or more. FMAudit Agent or device compiles information retrieved from both the operating system and the hardware. The results provided by compatible FMAudit products identify if the devices are locally attached, which allows copier, printer or office product companies to analyze their ratio to networked devices and the amount of pages for consideration in replacing with lower cost-per-page devices, or equipment relocation and consolidation.

The present invention may also provide enhanced network discovery settings so that a first application knows on which subnet or subnets a second application resides, and which internet protocols (IPs) their host processors are configured to. This is accomplished when the second application subscribes to the network routers and tells the routers to forward any traffic they receive on a specialized target class IP back to its host processor where the second application is listening on a specific port. The broadcast from the first application to the second application would typically be blocked by hardware security measures which don't allow traffic to cross subnets. In this case it can jump up to a determined number of hops.

For the network system to avoid loosing replies from the second application because of traffic peaks when multiple applications respond to the first application's request simultaneously, the request is mixed in a regular SNMP query to avoid using other ports and creating additional threads. The data transfer between the first application and the second application is protected using the security features provided by SNMP.

Having thus described the preferred embodiment of the invention, what is claimed is:

1. A method for monitoring a plurality of printing devices associated with a local network, the method comprising:
   providing a removable storage device to a client processor associated with the local network;
   executing, with the client processor, a computer program stored at least partially on the removable storage device to acquire printer usage data including toner coverage data corresponding to the plurality of printing devices and to apply a scaling algorithm that converts raw value data into a percentage value to the printing device toner coverage data of a printing device that reports toner coverage data in raw value format to be included in the acquired printing device usage data, the acquired printing device usage data being stored on the removable storage device; and
   providing the removable storage device to a remote processor to analyze the acquired printing device usage data, the remote processor not being associated with the local network,
   wherein the computer program includes conducting a first audit and a second audit of the printing device usage data, comparing the first audit with the second audit, and flagging a printing device that was present in one audit and absent from the other audit.

2. The method of claim 1, wherein the removable storage device is a USB flash drive.

3. The method of claim 1, wherein the processors are personal computers.

4. The method of claim 1, where the remote processor is positioned at a location remote from the client processor.

5. The method of claim 1, wherein the analysis of the acquired printing device usage data includes generating a report associated with the use of the plurality of printing devices.

6. A system for monitoring a plurality of printing devices associated with a local network, the system comprising:

a client processor associated with the local network, the client processor operable to receive a removable storage device, identify at least one of the printing devices by searching the local network, execute a computer program stored at least partially on the removable storage device and access the identified printing devices to acquire printing device usage data including toner coverage data therefrom, apply a scaling algorithm that converts raw value data into a percentage value to the printing device toner coverage data of a printing device that reports toner coverage data in raw value format to be included in the acquired printing device usage data, and store the acquired printing device usage data on a computer-readable medium, wherein the acquired printing device usage data is stored on the removable storage device; and a remote processor not associated with the local network, the remote processor operable to be accessed by the client processor through the internet, acquire at least a portion of the stored printing device usage data, and analyze the acquired printing device usage data, wherein the computer program includes conducting a first audit and a second audit of the printing device usage data, comparing the first audit with the second audit, and flagging a printing device that was present in one audit and absent from the other audit.

7. The system of claim 6, wherein the client processor accesses the remote processor through a web site.

8. The system of claim 7, wherein the client processor is operable to acquire instructions from the remote processor to enable the client processor to identify the printing devices, acquire printing device usage data, and store the printing device usage data.

9. The system of claim 6, wherein the remote processor is operable to analyze the printing device usage data to generate a report associated with the use of the plurality of printing devices.

10. The system of claim 6, wherein the remote processor includes a digital repository operable to store printing device usage data corresponding to a plurality of client processors.

11. The system of claim 6, wherein the remote processor includes a digital repository operable to store program data for use by the client processor.

12. The system of claim 6, wherein the client processor is operable to send an email to the remote processor including at least a portion of the acquired printing device usage data as an attachment.

13. A non-transitory computer-readable storage medium with an executable program stored thereon for monitoring a plurality of printing devices associated with a local network, the computer program comprising a plurality of code segments operable to:

identify at least one of the printing devices by searching the local network;

access the identified printing devices to acquire printing device usage data including toner coverage data therefrom;

apply a scaling algorithm that converts raw value data into a percentage value to the printing device toner coverage data of a printing device that reports toner coverage data in raw value format to be included in the acquired printing device usage data; and store the acquired printing device usage data on the computer-readable medium, and;

wherein the computer-readable storage medium includes a removable storage device provided to a client processor associated with the local network, wherein the computer program is stored at least partially on the removable storage device and the acquired printing device usage data is stored on the removable storage device, wherein the computer program includes conducting a first audit and a second audit of the printing device usage data, comparing the first audit with the second audit, and flagging a printing device that was present in one audit and absent from the other audit.

14. The storage medium of claim 13, wherein the computer readable medium is a removable storage device and the code segments are operable to be executed by the client processor directly from the removable storage device.

15. The storage medium of claim 14, wherein the removable storage device is a USB flash drive.

16. The storage medium of claim 13, further including a code segment operable to analyze the acquired printing device usage data and generate a report associated with the use of the plurality of printing devices.

17. The storage medium of claim 13, further including a code segment operable to send at least a portion of the acquired printer usage data through the internet from the client processor to a remote processor.

18. The storage medium of claim 17, wherein the code segments are operable to send an email though the internet to the remote processor, the email including at least a portion of the acquired printing device usage data as an attachment.

19. The storage medium of claim 13, further including a code segment operable to store acquired printing device usage data on a second computer-readable medium accessible through the local network.

20. The storage medium of claim 13, wherein at least one of the code segments is operable to be accessed by the client processor through the internet to enable the client processor to identify printing devices associated with the local network and acquire printing device usage data from the identified printing devices.

21. The method of claim 1, wherein the computer program further includes applying a scaling algorithm to at least a portion of the printing device usage data to be included in the acquired printing device usage data.

22. The method of claim 21, wherein the scaling algorithm is selected according to the printing device.

23. The method of claim 1, wherein the computer program further includes calculating a cost of ownership based on the first audit and the second audit.

24. The method of claim 1, wherein the computer program further includes calculating the printing device usage per department of an organization utilizing the printing devices.

25. The system of claim 6, wherein the scaling algorithm is selected according to the printing device.

26. The system of claim 6, wherein the client processor is further operable to conduct a first audit and a second audit of the printing device usage data, compare the first audit with the second audit, and flag a printing device that was present in one audit and absent from the other audit.

27. The system of claim 26, wherein the client processor is further operable to calculate a cost of ownership based on the first audit and the second audit.

28. The system of claim 1, wherein the client processor is further operable to calculate the printing device usage per department of an organization utilizing the printing devices.

29. The storage medium of claim 13, wherein the code segments are further operable to conduct a first audit and a second audit of the printing device usage data, compare the first audit with the second audit, and flag a printing device that was present in one audit and absent from the other audit.

30. The storage medium of claim 29, wherein the code segments are further operable to calculate a cost of ownership based on the first audit and the second audit.

31. The storage medium of claim 13, wherein the code segments are further operable to calculate the printing device usage per department of an organization utilizing the printing devices.

32. The method of claim 1, wherein the scaling algorithm includes the steps of
   calculating an average coverage based on a coverage sum from the printing device,
   calculating an average coverage squared based on a coverage sum squared from the printing device,
   multiplying the coverage sum by a scaling factor if the average coverage is less than one and a square root of the average coverage squared is greater than a first level, and
   multiplying the coverage sum squared by a scaling factor if the average coverage is less than one and the square root of the average coverage squared is greater than a first level.

33. The method of claim 1, wherein the computer program is further operable to report that a printing device is underutilized if a monthly volume of the printing device is less than a first percentage of a maximum duty cycle for the printing device.

34. The method of claim 1, wherein the computer program is further operable to report that a printing device is overutilized if a monthly volume of the printing device is greater than a second percentage of a maximum duty cycle for the printing device.

35. The system of claim 6, wherein the scaling algorithm includes the steps of
   calculating an average coverage based on a coverage sum from the printing device,
   calculating an average coverage squared based on a coverage sum squared from the printing device,
   multiplying the coverage sum by a scaling factor if the average coverage is less than one and a square root of the average coverage squared is greater than a first level, and
   multiplying the coverage sum squared by a scaling factor if the average coverage is less than one and the square root of the average coverage squared is greater than a first level.

36. The system of claim 6, wherein the client processor is further operable to report that a printing device is underutilized if a monthly volume of the printing device is less than a first percentage of a maximum duty cycle for the printing device.

37. The system of claim 6, wherein the client processor is further operable to report that a printing device is overutilized if a monthly volume of the printing device is greater than a second percentage of a maximum duty cycle for the printing device.

38. The storage medium of claim 13, wherein the code segments are further operable to include the following steps of the scaling algorithm calculating an average coverage based on a coverage sum from the printing device,
   calculating an average coverage squared based on a coverage sum squared from the printing device,
   multiplying the coverage sum by a scaling factor if the average coverage is less than one and a square root of the average coverage squared is greater than a first level, and
   multiplying the coverage sum squared by a scaling factor if the average coverage is less than one and the square root of the average coverage squared is greater than a first level.

39. The storage medium of claim 13, wherein the code segments are further operable to report that a printing device is underutilized if a monthly volume of the printing device is less than a first percentage of a maximum duty cycle for the printing device.

40. The storage medium of claim 13, wherein the code segments are further operable to report that a printing device is overutilized if a monthly volume of the printing device is greater than a second percentage of a maximum duty cycle for the printing device.

* * * * *